US009849776B2

United States Patent
Melone et al.

(10) Patent No.: US 9,849,776 B2
(45) Date of Patent: Dec. 26, 2017

(54) ZERO-TURN RADIUS LAWNMOWER WITH SUSPENSION SYSTEM

(71) Applicant: BRIGGS & STRATTON CORPORATION, Milwaukee, WI (US)

(72) Inventors: Mark J. Melone, Rome, NY (US); James F. Marshall, Munnsville, NY (US); Richard Smith, Morrisville, NY (US); Mark Lynch, Munnsville, NY (US); Travis Rasch, Hustisford, WI (US); Erik Slegelis, Port Washington, WI (US); Steven J. Weber, Germantown, WI (US); Denis Oswald, Hartford, WI (US)

(73) Assignee: BRIGGS & STRATTON CORPORATION, Milwaukee, WI (US)

( * ) Notice: Subject to any disclaimer, the term of this patent is extended or adjusted under 35 U.S.C. 154(b) by 0 days.

(21) Appl. No.: 15/226,811

(22) Filed: Aug. 2, 2016

(65) Prior Publication Data

US 2017/0028844 A1    Feb. 2, 2017

Related U.S. Application Data

(63) Continuation-in-part of application No. 15/082,765, filed on Mar. 28, 2016, now abandoned, which is a
(Continued)

(51) Int. Cl.
*A01D 34/64* (2006.01)
*B60G 9/00* (2006.01)
(Continued)

(52) U.S. Cl.
CPC .......... *B60K 17/105* (2013.01); *A01D 34/828* (2013.01); *A01D 75/18* (2013.01);
(Continued)

(58) Field of Classification Search
CPC .......... A01D 34/64; A01D 34/68; B60G 9/00; B60G 9/02; B60G 2200/326;
(Continued)

(56) References Cited

U.S. PATENT DOCUMENTS 2,756,045 A    7/1956  Savory
3,719,371 A    3/1973  Musgrave
(Continued)

OTHER PUBLICATIONS

Complaint filed on Mar. 20, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 (TJM/ATB), United States District Court, Northern District of New York, 9 pages.
(Continued)

*Primary Examiner* — Ruth Ilan
(74) *Attorney, Agent, or Firm* — Greenberg Traurig LLP

(57) ABSTRACT

Some embodiments of the invention provide a suspension system coupled to a main frame of ride-on equipment including at least one subframe coupled to the main frame with a pivot including pivot axis. Some embodiments include at least one transaxle assembly supported on the at least one subframe coupled to a drive wheel, and a power source supported on the main frame coupled to the at least one transaxle assembly. Some embodiments include driven pulleys, idler pulleys and backside idler pulleys supported by the at least one subframe coupled to a power source not supported by the at least one subframe. Some embodiments
(Continued)

include two independently suspended subframes, each independently pivotable on the pivot axis with respect to each other and the main frame.

20 Claims, 25 Drawing Sheets

Related U.S. Application Data continuation of application No. 13/840,070, filed on Mar. 15, 2013, now Pat. No. 9,161,490.

(60) Provisional application No. 61/677,288, filed on Jul. 30, 2012, provisional application No. 61/643,809, filed on May 7, 2012.

(51) Int. Cl.
  B60K 17/00 (2006.01)
  B60K 17/10 (2006.01)
  A01D 34/82 (2006.01)
  A01D 75/18 (2006.01)

(52) U.S. Cl.
  CPC .......... *B60G 9/003* (2013.01); *B60G 2204/18* (2013.01); *B60G 2300/084* (2013.01)

(58) Field of Classification Search
  CPC ........ B60G 2200/322; B60G 2300/084; B60K 17/04; B60K 17/105
  USPC .............. 180/312, 357, 348, 53.1, 6.4, 6.64; 280/124.156, 124.116, 124.109; 56/14.7
  See application file for complete search history.

(56) References Cited

U.S. PATENT DOCUMENTS

| | | | |
|---|---|---|---|
| 3,796,275 A * | 3/1974 | Bouyer | B62D 61/08 180/333 |
| 3,940,161 A | 2/1976 | Allison | |
| 3,954,255 A | 5/1976 | Keijzer et al. | |
| 4,132,121 A | 1/1979 | Clarke | |
| 4,256,292 A | 3/1981 | Sullivan, Jr. et al. | |
| 4,577,712 A | 3/1986 | Foote et al. | |
| 4,592,439 A | 6/1986 | Collard et al. | |
| 4,809,796 A * | 3/1989 | Yamaoka | B60K 17/105 180/308 |
| 5,042,238 A | 8/1991 | White, III et al. | |
| 5,343,974 A | 9/1994 | Rabek | |
| 5,367,864 A | 11/1994 | Ogasawara et al. | |
| 5,381,647 A | 1/1995 | Eberle | |
| 5,487,535 A | 1/1996 | Carter et al. | |
| 5,706,907 A | 1/1998 | Unruh | |
| 5,946,893 A * | 9/1999 | Gordon | B60G 3/01 56/15.7 |
| 5,996,982 A | 12/1999 | Bell | |
| 6,101,794 A | 8/2000 | Christopher et al. | |
| 6,510,678 B2 * | 1/2003 | Ferris | A01D 34/64 56/15.8 |
| 6,830,115 B2 | 12/2004 | Okada et al. | |
| 6,874,593 B2 | 4/2005 | Abend et al. | |
| 6,904,985 B2 | 6/2005 | Ferree et al. | |
| 7,107,746 B2 | 9/2006 | Melone et al. | |
| 7,374,187 B2 | 5/2008 | Melone et al. | |
| 7,600,769 B2 * | 10/2009 | Bessho | B60G 9/022 280/124.109 |
| 7,694,769 B2 | 4/2010 | McGuire | |
| 7,775,314 B2 | 8/2010 | Blais et al. | |
| 7,793,745 B2 | 9/2010 | Witt et al. | |
| 7,900,943 B2 | 3/2011 | Stewart | |
| 9,161,490 B2 | 10/2015 | Melone | |
| 2002/0179341 A1 * | 12/2002 | Boyer | B60K 17/04 180/6.48 |
| 2003/0127266 A1 | 7/2003 | Kirkpatrick | |
| 2013/0291508 A1 | 11/2013 | Melone | |
| 2015/0078871 A1 | 3/2015 | Eavenson, Sr. et al. | |

OTHER PUBLICATIONS

Expert Declaration of Timothy M. Hicks Regarding U.S. Pat. No. 7,107,746 filed on Feb. 18, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 (LEK/ATB), United States District Court, Northern District of New York, 3 pages.

Reply Brief in Support of Defendants' Motion for Summary Judgment of Invalidity of U.S. Pat. No. 7,107,746 filed on Feb. 10, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 (LEK/ATB), United States District Court, Northern District of New York, 14 pages.

Reply Brief in Support of Defendants' Motion for Summary Judgment of Invalidity of U.S. Pat. No. 6,510,678 filed on Feb. 10, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 (LEK/ATB), United States District Court, Northern District of New York, 14 pages.

Memorandum of Law in Support of Defendants' Notice of Motion for Summary Judgment of Invalidity for Indefiniteness filed on Jan. 30, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 (LEK/ATB), United States District Court, Northern District of New York, 10 pages.

Declaration of Jeffrey M. Olson in Support of Defendants' Opening Claim Construction Brief and Motion for Summary Judgement of Indefiniteness filed on Jan. 30, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 (LEK/ATB), United States District Court, Northern District of New York, 212 pages.

Defendants' Opening Claim Construction Brief filed on Jan. 30, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 (LEK/ATB), United States District Court, Northern District of New York, 30 pages.

Defendants' Corrected Answer to Complaint and Defendant Denver Global Products, Inc.'s Counterclaims and Demand for Jury Trial filed on Jun. 12, 2013 in *Briggs & Stratton Corporation, Briggs & Stratton Power Products Group, LLC v. Chongqing RATO Power Co., Ltd; RATO North America; Denver Global Products, Inc.*, 5:13-CV-0316 (LEK/ATB), United States District Court, Northern District of New York, 15 pages.

Letter Brief to Court regarding significant recent authority relating to the parties' claim construction briefing and Denver Global Products, Inc.'s pending Motion for Summary Judgement of Invalidity for Indefiniteness filed on Sep. 15, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 (LEK/ATB), United States District Court, Northern District of New York, 17 pages.

Letter Brief to Court regarding significant recent authority relating to Denver Global Products, Inc.'s pending Motion for Summary Judgement of Invalidity for Indefiniteness filed on Jun. 3, 2014 in *Briggs & Stratton Corporation, Briggs & Stratton Power Products Group, LLC v. Chongqing RATO Power Co., Ltd; RATO North America; Denver Global Products, Inc.*, 5:13-CV-0316 (LEK/ATB), United States District Court, Northern District of New York, 20 pages.

Defendants' Responsive Claim Construction Brief filed on Mar. 3, 2014 in *Briggs & Stratton Corporation, Briggs & Stratton Power Products Group, LLC v. Chongqing RATO Power Co., Ltd; Rato*

*(56)* References Cited

OTHER PUBLICATIONS

*North America; Denver Global Products, Inc.*, 5:13-CV-0316 (LEK/ATB), United States District Court, Northern District of New York, 29 pages.

Letter to Court addressing statements in Brigg's letter request filed on Feb. 21, 2014 in *Briggs & Stratton Corporation, Briggs & Stratton Power Products Group, LLC* v. *Chongqing RATO Power Co., Ltd; RATO North America; Denver Global Products, Inc.*, 5:13-CV-0316 (LEK/ATB), United States District Court, Northern District of New York, 2 pages.

Reply Brief in Support of Defendants' Motion for Summary Judgment of Invalidity for Indefiniteness filed on Feb. 24, 2014 in *Briggs & Stratton Corporation, Briggs & Stratton Power Products Group, LLC* v. *Chongqing RATO Power Co., Ltd; RATO North America; Denver Global Products, Inc.*, 5:13-CV-0316 (LEK/ATB), United States District Court, Northern District of New York, 15 pages.

\* cited by examiner

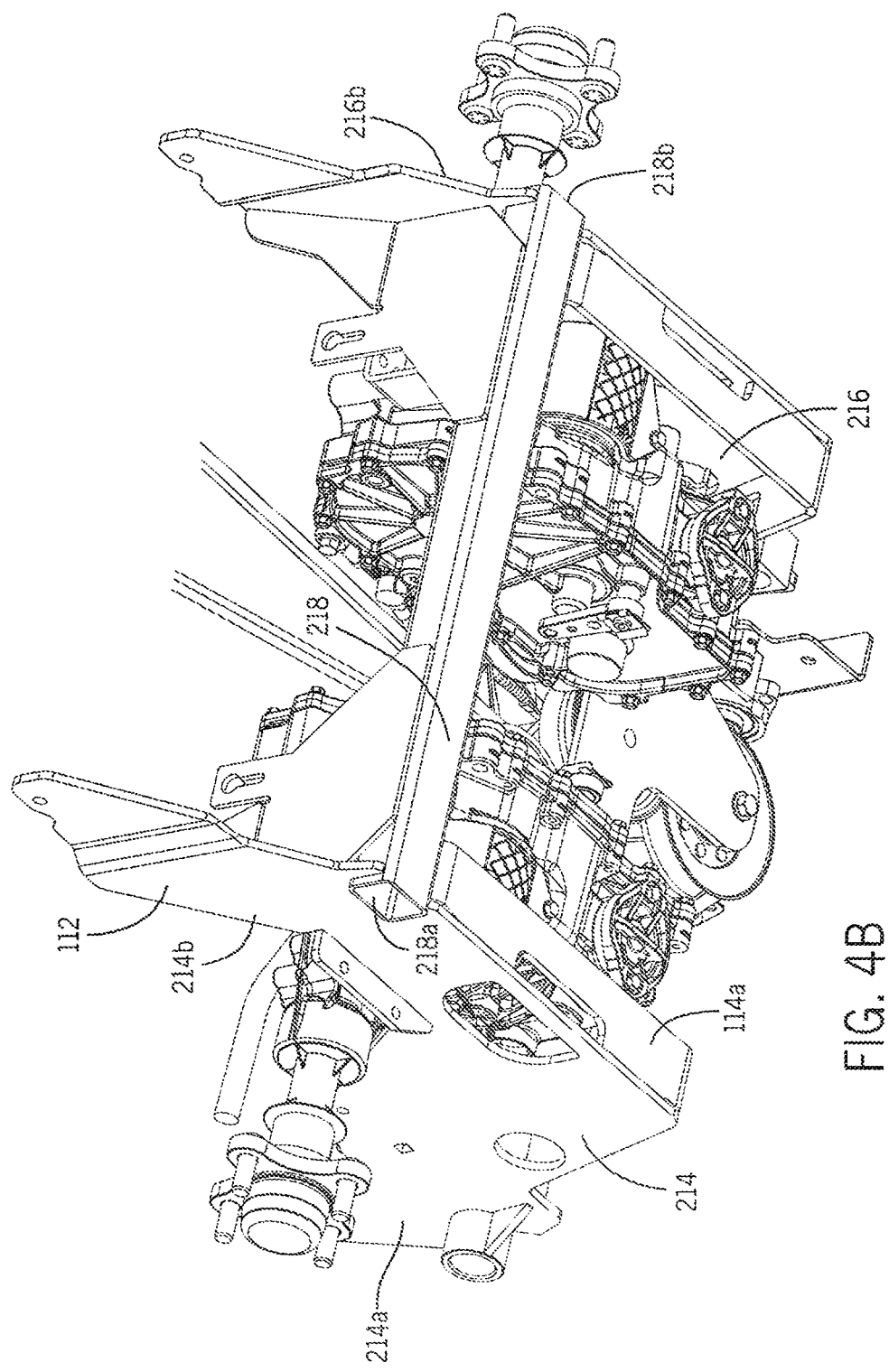

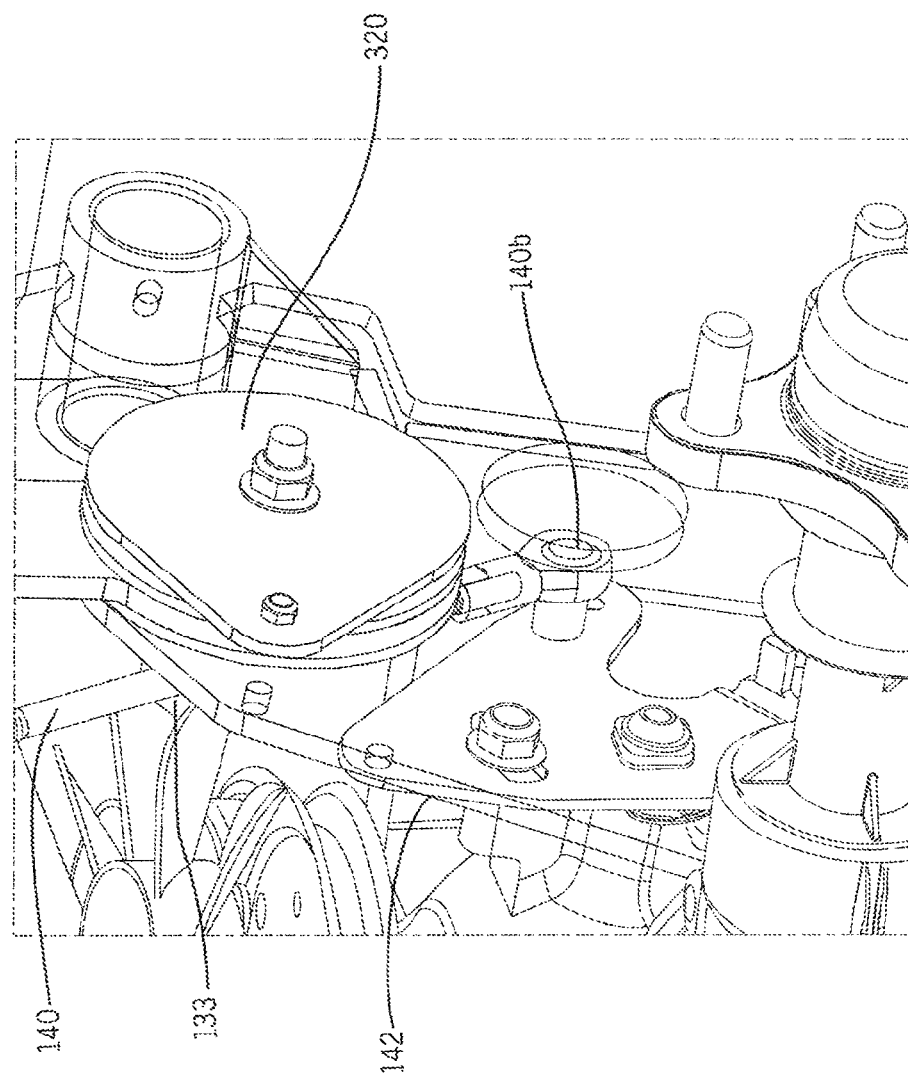

ZERO-TURN RADIUS LAWNMOWER WITH SUSPENSION SYSTEM

RELATED APPLICATIONS

This application is a continuation-in-part of U.S. patent application Ser. No. 15/082,765, filed Mar. 28, 2016, which is a continuation-in-part of U.S. patent application Ser. No. 13/840,070, filed Mar. 15, 2013, which claims priority under 35 U.S.C. §119 to U.S. Provisional Patent Application No. 61/677,288, filed on Jul. 30, 2012, and U.S. Provisional Patent Application No. 61/643,809, filed on May 7, 2012, the entire contents of which are incorporated herein by reference.

BACKGROUND

Hydrostatic transaxles have become prevalent in the ZTR mower industry. Hydrostatic transaxles combine the hydraulic pump and one or more hydraulic wheel motors into a single unit, thereby simplifying and reducing the overall cost of the drive system of ZTR mowers and other hydraulically-driven devices. The hydraulic pump of the hydraulic transaxle is mechanically driven by an internal combustion engine (or similar drive unit) via a belt-and-pulley system, and the hydraulic pump in turn drives the hydraulic motor for each drive wheel. However, due to the integration of the hydraulic pump and hydraulic wheel motors into a single unit, suspension of the drive wheels on a ZTR mower utilizing hydrostatic transaxles presents several challenges. One of the foremost challenges is the variation in belt angle between the drive pulley coupled to the power take-off shaft of the internal combustion engine, and the driven pulley(s) of the hydraulic pump on the hydrostatic transaxle. If the belt angle between the drive and driven pulley(s) is too great, the belt may run off of one or more of the pulleys and render the drive system inoperable, or may wear at an unacceptable rate. Due to these challenges, suspension of drive wheels driven by hydrostatic transaxles has been generally avoided.

SUMMARY

Some embodiments of the invention include a suspension system for ride-on equipment comprising a main frame including at least two independent subframes separately suspended from and coupled to opposite sides of the main frame. The at least two independent subframes comprising a first subframe including a first pivot proximate a first end of the first subframe, and a second pivot proximate a first end of the second subframe. The first pivot is configured and arranged to enable pivotal rotation of the first subframe on the main frame around a pivot axis, and the second pivot configured and arranged to enable pivotal rotation of the second subframe on the main frame around the pivot axis. A first transaxle assembly is supported by the first subframe and is coupled by a belt to at least one external power source. The at least one external power source is coupled to and supported by the main frame and positioned external to the first and second subframes. A second transaxle assembly is supported by the second subframe and coupled by the belt to the at least one external power source. The second transaxle assembly configured and arranged to be pivoted by the second subframe with respect to the main frame independent of the first transaxle assembly and the first subframe. Further, the first transaxle assembly is configured and arranged to be pivoted by the first subframe with respect to the main frame independent of the second transaxle assembly and the second subframe.

In some embodiments, the suspension system further comprises a first compressible suspension component coupling a second end of the first subframe to a first side of the main frame, and a second compressible suspension component coupling a second end of the second subframe to a second side of the main frame.

In some embodiments, the first transaxle assembly includes at least one driven pulley positioned suspended with the first subframe. In some further embodiments, the second transaxle assembly includes at least one driven pulley positioned suspended by the second subframe.

In some embodiments, at least one of the first transaxle assembly and second transaxle assembly are configured and arranged to be belt-driven by the at least one external power source during pivotal motion about the main frame.

In some further embodiments, at least one of the first transaxle assembly and second transaxle assembly comprises a hydrostatic transaxle. In some embodiments, at least one of the first absorbing suspension component and the second absorbing suspension component comprises a shock absorber. In some embodiments, the shock absorber is a coil spring shock absorber.

In some embodiments of the invention, the first subframe comprises a first support member and a first pulley support positioned generally perpendicular to the first support member, and extending towards the second subframe. The second subframe comprises a second support member and a second pulley support positioned generally perpendicular to the second support member.

In some embodiments, the suspension system further comprises a pulley and belt drive assembly including at least one backside idler pulley positioned supported on at least one of the first pulley support and the second pulley support, and at least one belt idler pulley positioned outside of the first and second subframes and supported by the main frame. Further, pulley and belt drive assembly includes at least one endless belt coupled with at least one driven pulley, the at least one belt idler pulley and the at least one backside idler pulley. The at least one driven pulley positioned suspended by at least one of the first subframe and the second subframe.

In some embodiments, the at least one endless belt is further coupled with at least one drive pulley of the at least one external power source, and where the at least one backside idler pulley is configured and arranged to pivot with respect to the at least one drive pulley.

In some embodiments, the at least one drive pulley is configured and arranged to rotate the at least one backside idler pulley. In some further embodiments, the at least one drive pulley is coupled to rotate the at least one driven pulley.

In some further embodiments of the invention, the suspension system further comprises an auxiliary drive pulley coupled to a power take-off shaft of the at least one external power source. Some further embodiments of the invention include a cutter assembly coupled to the auxiliary drive pulley by the at least one endless belt. Some other embodiments include a tensioner spring coupled between an eyebolt of the at least one belt idler pulley and the at least one belt idler pulley. In some embodiments, the tensioner spring is coupled to a swing arm.

In some embodiments, an engine is coupled to and supported by the main frame, where at least two independent subframes are configured and arranged to pivot with respect to the engine. In some other embodiments, a mower deck is coupled to and supported by the main frame.

In some embodiments, the first and second pivots are positioned passing through one or more bearings positioned within a pivot sleeve, where the one or more bearings support a pivoting motion of the first and second subframes.

DESCRIPTION OF THE DRAWINGS

FIG. 4B shows a partial perspective view of ZTR mower components and suspension system in accordance with some embodiments of the invention.

FIG. 10A illustrates a perspective close-up view of the lower portion of the compensated control linkage assembly in accordance with another embodiment of the invention.

DETAILED DESCRIPTION

Figure 1:
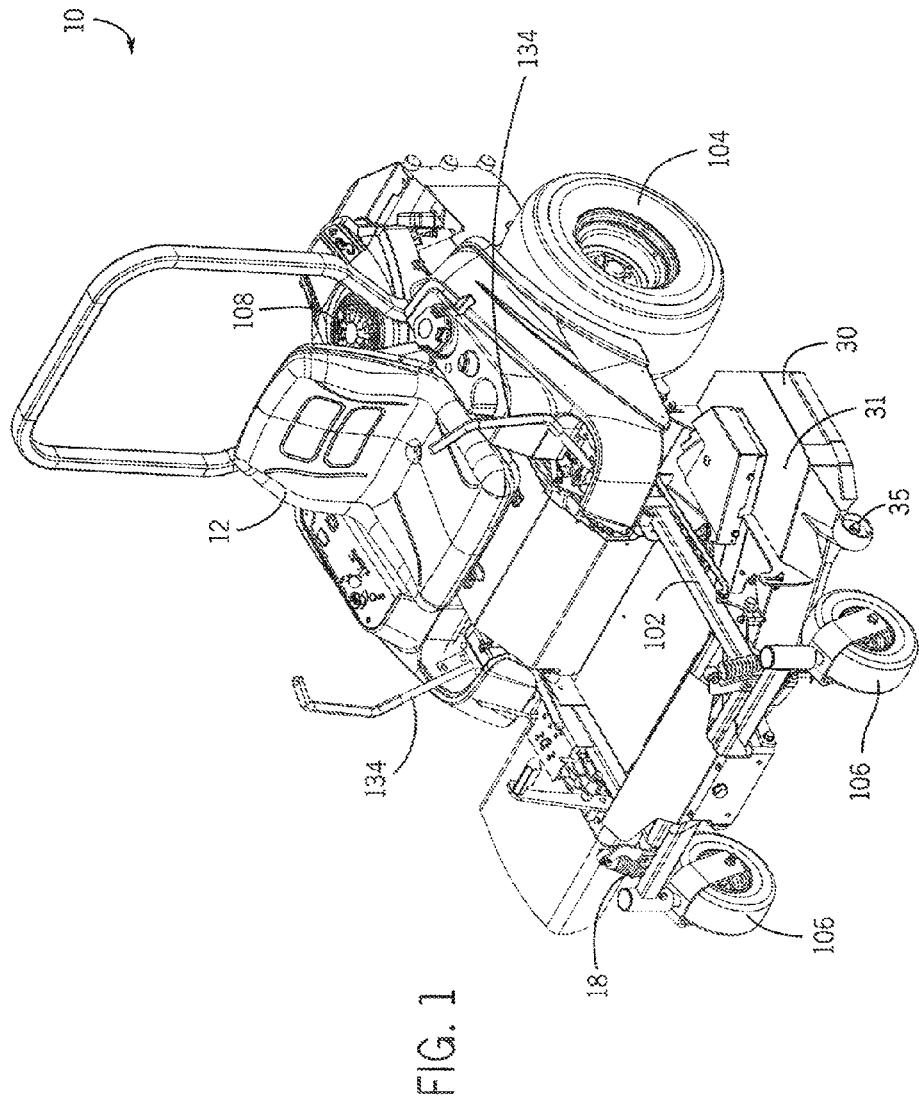
FIG. 1 illustrates an isometric view of a ZTR mower in accordance with some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates an isometric view of a ZTR mower 10 in accordance with some embodiments of the invention. The ZTR mower 10 can include a main frame 102, front caster wheels 106, and rear drive wheels 104 and a seat 12. The ZTR mower 10 can also include a mower deck 31 including a front cutter assembly 30 positioned between the front caster wheels 106 and rear wheels 104. Some embodiments can include front caster wheels 35 mounted to the front cutter assembly 30 that aid in maintaining the height of the front cutter assembly 30, thereby preventing damage from rocks and other large debris. In some embodiments, the ZTR mower 10 includes at least one power source. For example, in some embodiments, the mower 10 can include an engine, such as an internal combustion engine 108 shown behind the seat 12 in FIG. 1. In some embodiments, the engine 108 can be coupled to a power take-off shaft 109 (not shown). In some embodiments, the power take-off shaft 109 is coupled to at least one hydrostatic axles 114 (not shown) via an endless belt 132 (not shown). In some further embodiments, the ZTR mower 10 can also include left and right control paddles assemblies 134. In some further embodiments, the ZTR mower 10 can include alternative paddle assembly 134 arrangements.

Figure 2:
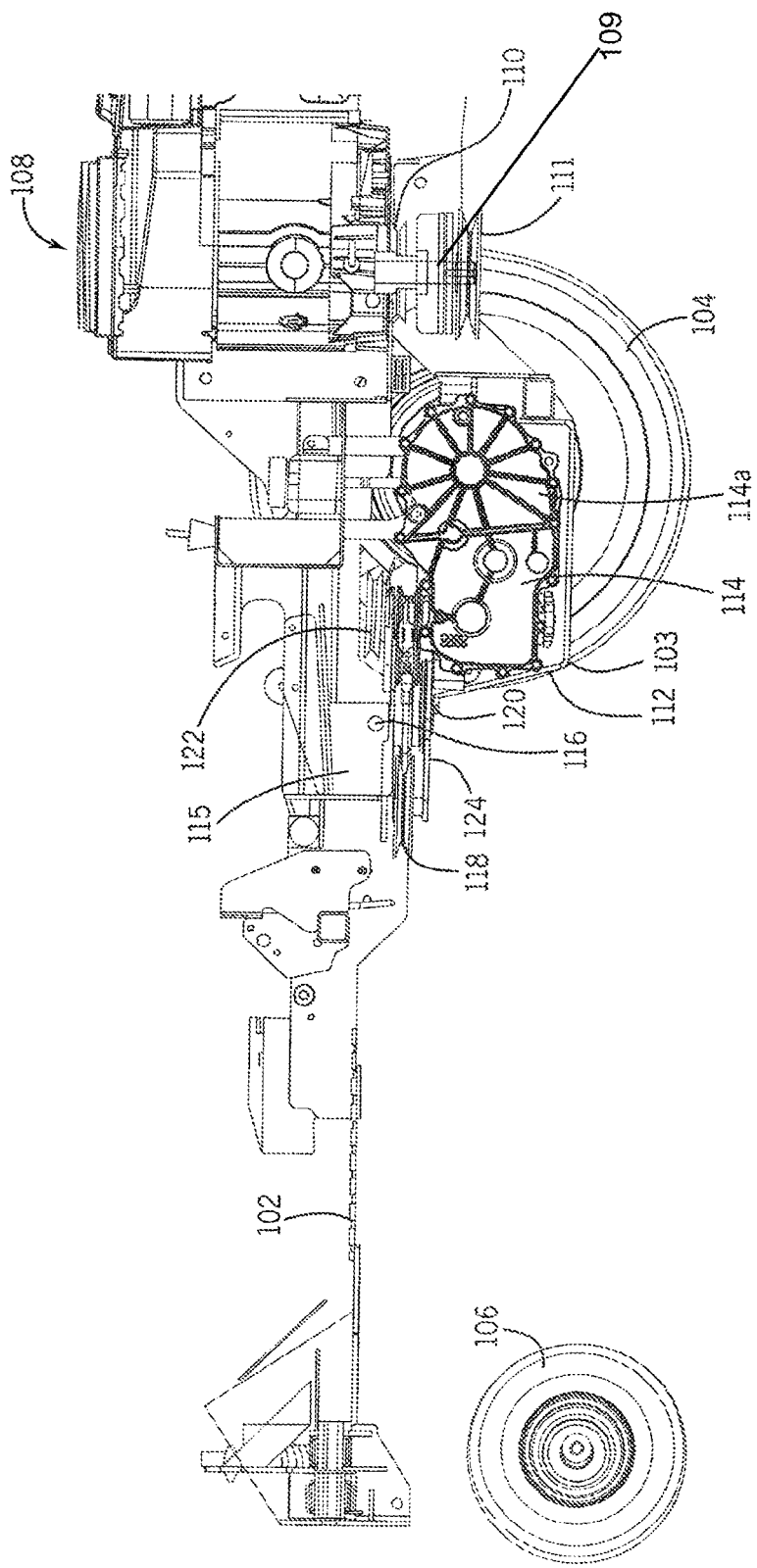
FIG. 2 illustrates a side sectional view of ZTR mower components in accordance with some embodiments of the invention.

FIG. 2 shows a side sectional view of various ZTR mower components in accordance with one embodiment of the invention. For ease of understanding, many conventional components commonly present in ZTR mowers (e.g., control handles, seat, mower deck, etc.) have been omitted from FIG. 2. However, one of ordinary skill in the art will readily understand that such conventional components may be included in the embodiments described herein. In some embodiments, the ZTR mower 10 of FIG. 2 comprises a main frame 102 supporting both rear drive wheels 104 and front caster wheels 106. In some embodiments, the main frame 102 further supports an internal combustion engine 108, which operates to drive both the drive wheels 104, other primary components, as well as one or more auxiliary components attached to the ZTR mower 10, such as the cutting blades of the front cutter assembly 30 (shown in FIG. 1). Some embodiments include the internal combustion engine 108 capable of driving the drive wheels 104 in addition to other components via one or more drive pulleys, including a drive pulley 110 mounted to a power take-off shaft 109 extending therefrom.

In some embodiments, the ZTR mower 10 as illustrated in FIG. 2 further includes a subframe 112 including a first axis 112a pivotally mounted to main frame 102 about a pivot 115 including a pivot axis 116. In some embodiments, the subframe 112 may be mounted to main frame 102 using an alternative technology that allows for substantially translational movement. In some embodiments, the subframe 112 supports thereon one or more transaxle assemblies 114a. For example, some embodiments include one or more hydrostatic transaxles 114. In some embodiments, the transaxles 114 contain both a hydraulic pump, a hydraulic valve (not shown), and a hydraulic motor (not shown) for powering the drive wheels 104. Some embodiments can include one or more belt idler pulleys 118 mounted on the subframe 112. In some further embodiments, the subframe 112 further supports one or more backside idler pulleys 120a, 120b. In other embodiments, idler pulley(s) 118 and backside idler pulleys 120a and 120b are attached to the subframe 112 via a spindle (not shown) to allow rotation of the pulley, and in some other embodiments, they can be attached via a plate 124, which may be integrally formed from the subframe 112. In some embodiments, idler pulley(s) 118 and backside idler pulleys 120a, 120b receive an endless belt 132 (not shown) that is driven by drive pulley 110 on the power take-off shaft 109 of internal combustion engine 108. In some embodiments, the endless belt 132 is also received by pulleys 122a, 122b coupled to the hydraulic pump of hydrostatic transaxle 114. In some embodiments of the invention, through this pulley-belt coupling, power from the internal combustion engine 108 is transferred to hydrostatic transaxle 114 via power take-off shaft 109 to operate drive wheels 104. In some other embodiments, alternative methods of driving hydrostatic transaxle 114, such as through a universal drive shaft can be used.

Figure 3:
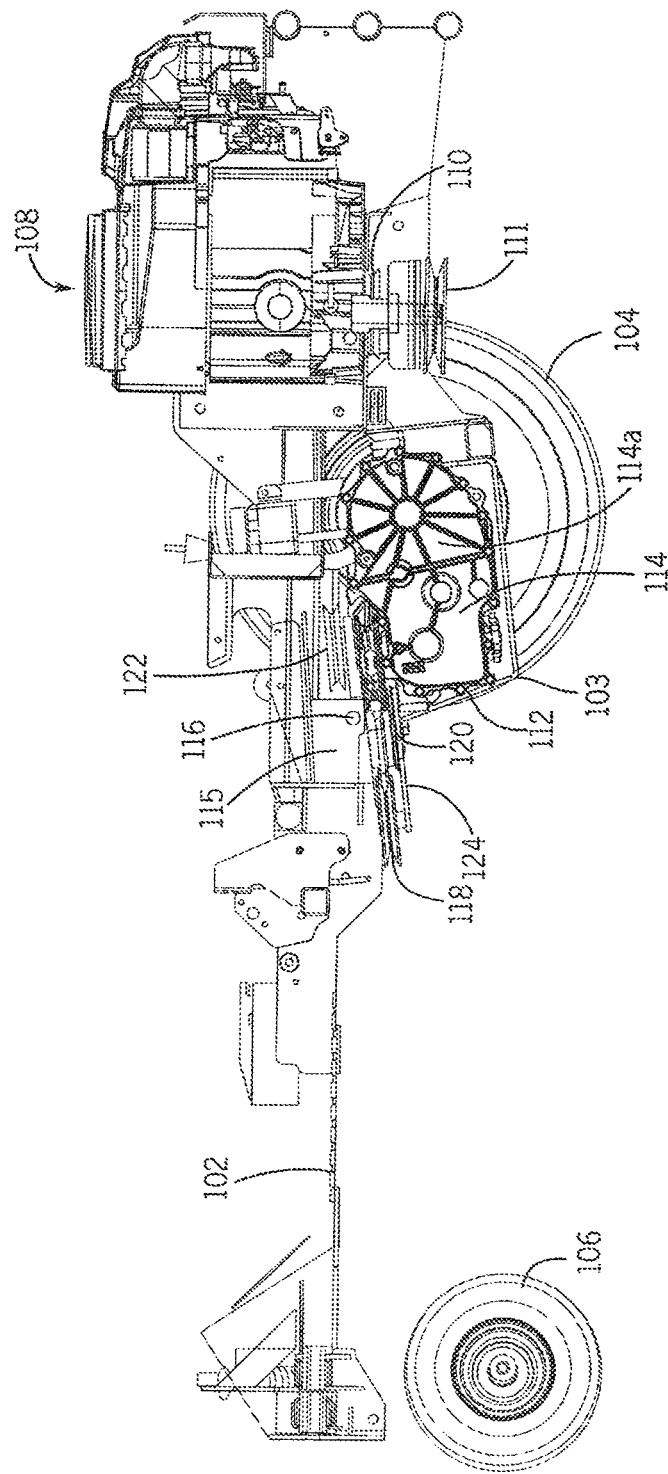
FIG. 3 illustrates a side sectional view of ZTR mower components in accordance with some embodiments of the invention.

FIG. 3 shows another side sectional view of various ZTR mower components in accordance with one embodiment of the invention. As illustrated in this view, the subframe 112 has travelled counterclockwise about pivot axis 116 to illustrate a compressed state of the suspension system 103. As can be seen, each of the components mounted on subframe 112 rotate about pivot axis 116, including idler pulley(s) 118, backside idler pulleys 120, and at least one driven pulley 122a, 122b on hydrostatic transaxle 114. In some embodiments, power is transmitted from the drive pulley 110 via an endless belt 132. In some embodiments, the endless belt 132 can be an "A" section belt, although in other embodiments, a "V" section belt, a flat belt, or other type of belt can be used.

In some embodiments, as the suspension travels, the belt angle only changes between the back side idler pulleys 120a, 120b and the drive pulley 110 where the distance between these particular pulleys is the greatest. Most notably, idler pulley(s) 118 and backside idler pulleys 120a, 120b travel in the same plane (shown as pulley plane 400 in FIGS. 14A and 14B) as the driven pulley 122a, 122b upon rotation about pivot axis 116, which prevents belt misalignment between these pulleys when subframe 112 travels through its suspension arc. As described earlier, if the idler pulleys 118, 120a, 120b were to travel or rotate about a different plane than driven pulleys 122a, 122b on hydrostatic transaxle 114 (i.e. not within pulley plane 400), significant belt misalignment may cause the belt 132 to "jump" or run off of the pulley system and render the system inoperable. However, as shown in comparing FIG. 2 and FIG. 3, the only belt angle change between pulleys in the present embodiment would be between backside idler pulleys 120a, 120b and drive pulley 110 mounted to the power take-off shaft 109. The risk of belt "jump" due to misalignment is greatly diminished under this construction because there is a significant distance between backside idler pulleys 120a, 120b and drive pulley 110, thereby minimizing the belt angle change when subframe 112 travels through its suspension arc. Furthermore, in general, backside idler pulleys 120a, 120b have a higher tolerance for belt angle changes during operation than other types of pulleys, and therefore the risk of the belt 132 decoupling is greatly diminished.

Figure 4A:
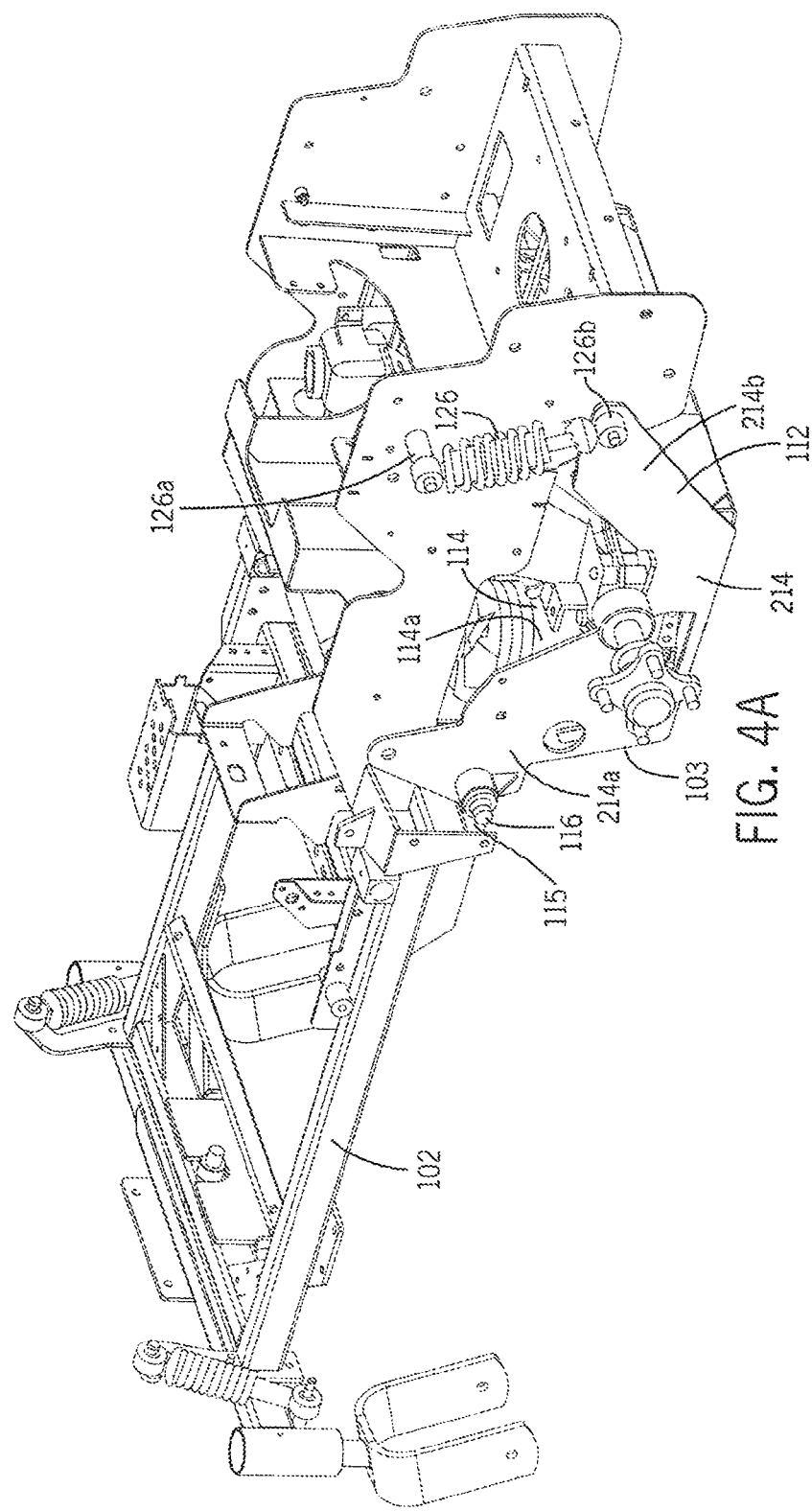
FIG. 4A shows a perspective view of ZTR mower components and suspension system in accordance with some embodiments of the invention.

FIGS. 4A and 4B show perspective views of various ZTR mower components in accordance with one embodiment of the invention. As discussed previously, the subframe 112 is pivotally coupled to main frame 102 at a pivot 115 including a pivot axis 116. In some embodiments, the subframe 112 comprises a first support 214 including a first end 214a and a second end 214b, and a second support 216 having a first end 216a and a second end 216b. In some embodiments, the first support 214 and second support 216 are coupled by at least one substantially perpendicular and substantially horizontal third support 218. In some embodiments, the third support 218 is coupled to the second end 214b at a third support first end 218a, and the third support 218 is coupled to the second end 216b at a third support second end 218b. As discussed earlier, in some embodiments, the subframe 112 including a first axis 112a is pivotally mounted to the main frame 102 about a pivot 115 including a pivot axis 116. In some embodiments, a pivot 115 is coupled to the first end 214a of the first support 214 and the first end 216a of the second support 216.

In some further embodiments, the subframe 112 is further coupled to a motion absorbing suspension component. In some embodiments, the motion absorbing suspension component can include a compressible suspension component such as a coil spring-type suspension component 126. In some embodiments, a first end 126a of the compressible suspension component 126 is coupled to the main frame 102, and a second end 126b of the compressible suspension component is coupled to the subframe 112. In some embodiments, the suspension component 126 is coupled to a second end 214b of the first support 214 or a second end 216b of the second support 216, or both.

In the perspective view of FIG. 4A, the subframe 112 is shown extending continuously between both the right and left sides of main frame 102 to hold two hydrostatic transaxles 114, each of which can drive a separate drive wheel 104 (not shown). As shown, the subframe 112 holds both hydrostatic transaxles 114, each drive wheel 104 (not shown), and is translated about the suspension arc of subframe 112 as the ZTR mower 10 travels across varying terrain. In some embodiments, the subframe 112 need not extend continuously between the right and left sides of the main frame 102.

Figure 5:
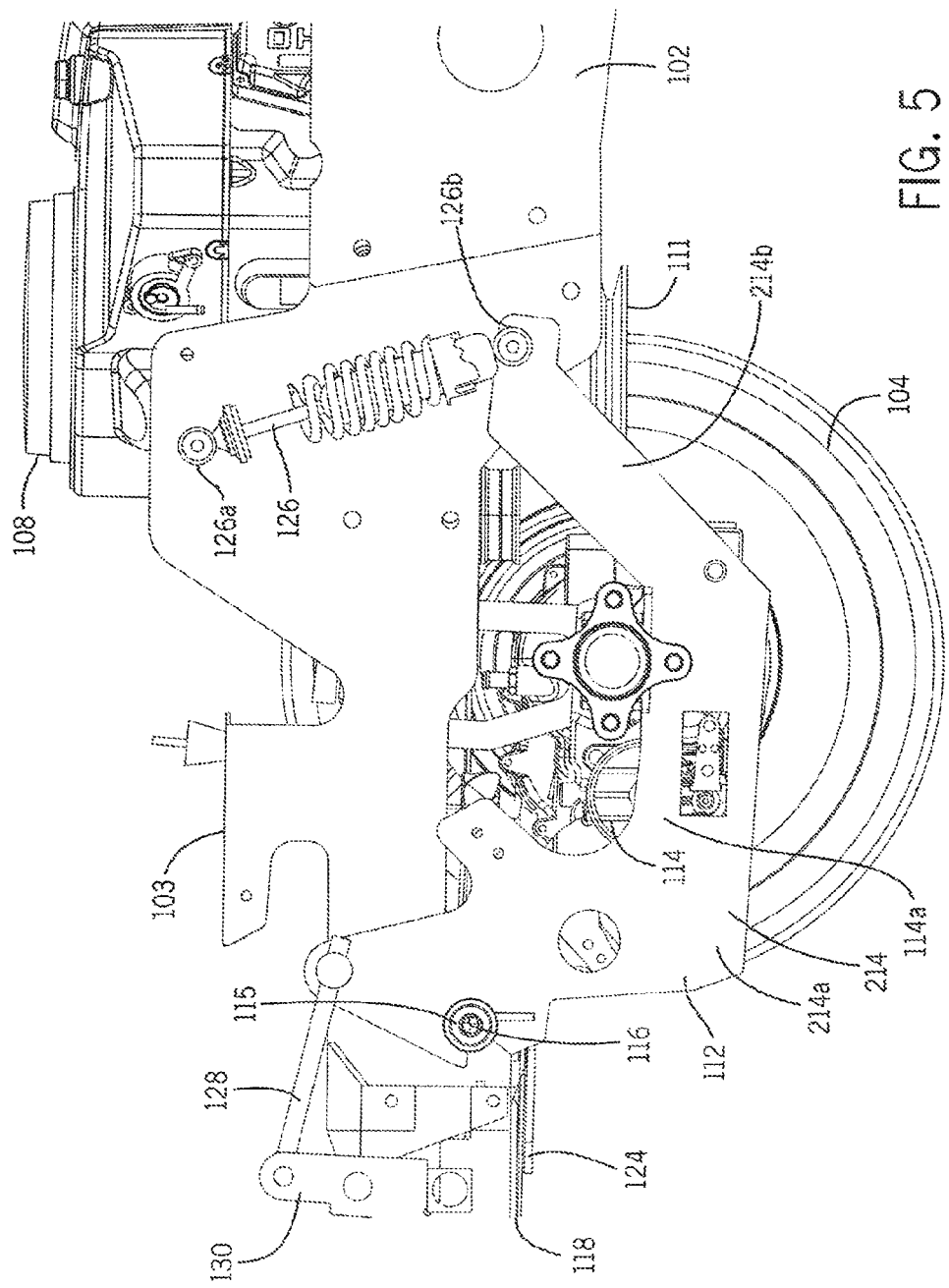
FIG. 5 shows a side sectional view of a suspension system in accordance with another embodiment of the invention.
Figure 6:
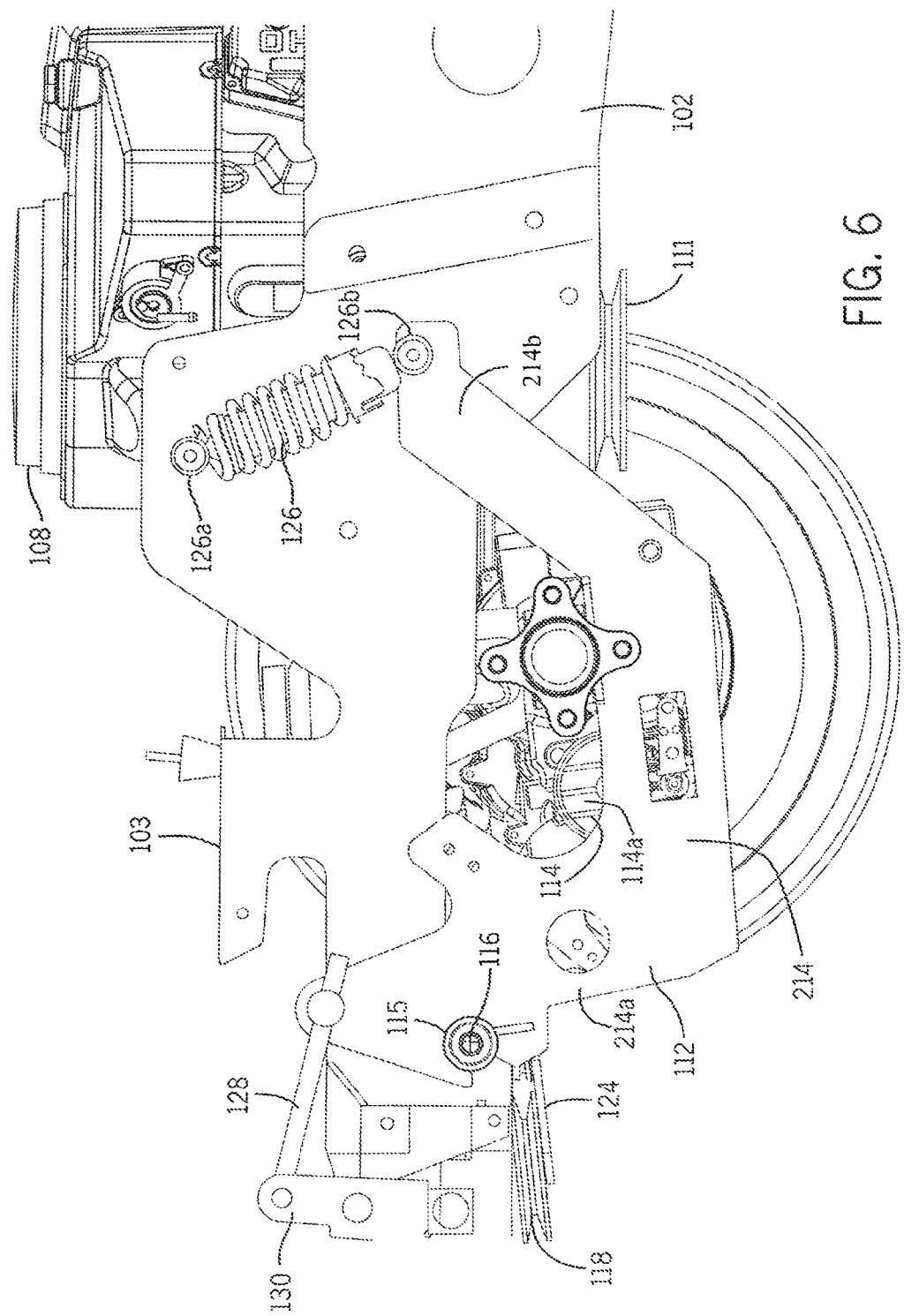
FIG. 6 shows a side sectional view of a suspension system in accordance with another embodiment of the invention.

FIG. 5 shows another side sectional view of the suspension system 103 according to one embodiment of the invention. In some embodiments, one of the drive wheels 104 has been omitted from the figure for clarity. As shown, in some embodiments, a compressible suspension component, such as the coil spring-type suspension component 126 is pivotally coupled to both main frame 102 (shown as 126a) and subframe 112 (shown as 126b). This arrangement allows for restricted rotation of subframe 112 about pivot axis 116. In some other embodiments, the coil spring-type suspension component 126 can be replaced by any appropriate shock absorber. In some embodiments, the subframe 112 is pivotally coupled to a link 128, which is in turn pivotally coupled to a bell crank 130. Some embodiments include link 128 and bell crank 130 coupled to a mower deck (not shown) to allow corresponding movement of the mower deck in association with movement of subframe 112. FIG. 6 shows a similar side sectional view as that depicted in FIG. 5, but with coil spring-type suspension component 126 in a compressed position. Again, a comparison between FIG. 5 and FIG. 6 clearly shows that all components mounted upon subframe 112 rotate about pivot axis 116, including any desired idler pulleys (not shown) and the hydrostatic transaxle 114.

As discussed earlier, in some embodiments, the mower 10 can include a front cutter assembly 30 (FIG. 1 illustrates an isometric view of ZTR mower 10 in accordance with some embodiments of the invention and shows a front cutter assembly 30 positioned between the front caster wheels 106 and rear wheels 104). As shown in FIG. 5 and FIG. 6, some embodiments of the invention include an auxiliary pulley 111. In some embodiments, the auxiliary pulley 111 can be coupled to the engine 108 via a power transfer assembly (e.g. a clutch assembly not shown) to enable the rotational torque of the power take-off shaft 109 to drive the cutter assembly 30 by an endless belt (not shown). In some embodiments, a user can control the coupling of the engine 108 to the cutter assembly 30 through a conventional power transfer assembly, and in some further embodiments, the user can control the rotational speed of the auxiliary pulley 111 to control the cutter assembly 30. In some other embodiments, further auxiliary pulleys can be coupled to the power take-off shaft 109. In other embodiments, one or more further auxiliary pulleys (not shown) can be coupled to one or more further conventional auxiliary components (not shown).

Figure 7:
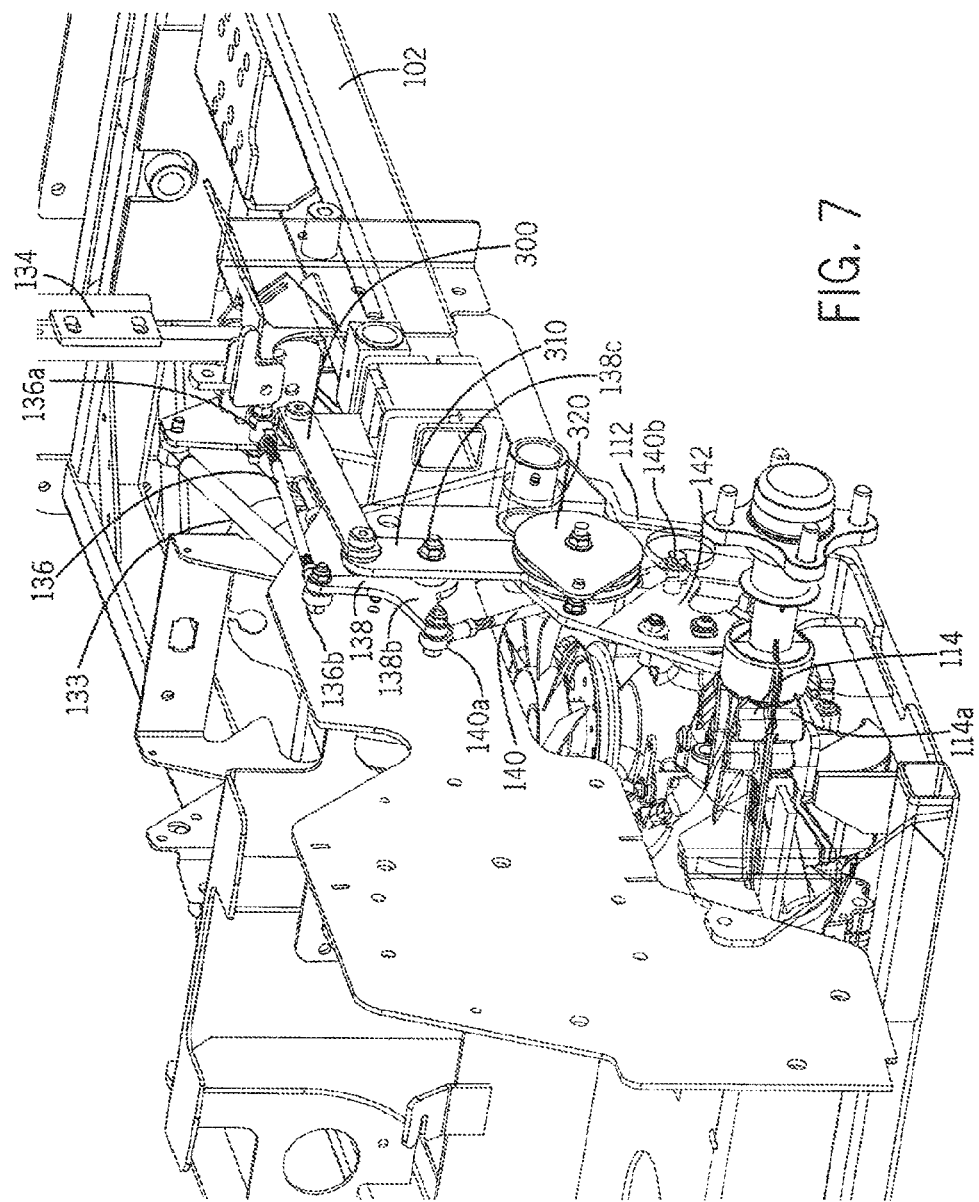
FIG. 7 illustrates a perspective view of a hydrostatic transaxle control system in accordance with embodiments of the invention.

In some embodiments, the mower 10 can include other features. For example, in some embodiments, a control linkage assembly 133 can be used to control the power provided by an internal combustion engine 108. For example, FIG. 7 shows a perspective view of a control linkage assembly 133 for operator control of hydrostatic transaxle 114. In some embodiments, one or more hydrostatic transaxles 114 that combine a hydraulic pump (not shown) and hydraulic wheel motor (not shown) into a single unit, are coupled to the engine 108 by a pulley and belt drive assembly 117. In some embodiments, an operator can deploy one or more control paddles 134 to manipulate at least one hydrostatic transaxle 114 to drive the drive wheels 104 (not shown). In some embodiments, an operator can deploy one or more control paddles 134 to manipulate at least one hydrostatic transaxle 114 to move in either a forward or reverse direction, or to remain neutral. In some embodiments, one or more control paddles 134 coupled to the ZTR mower 10 can be coupled to a hydrostatic transaxle pump valve (not shown) to allow the control of hydraulic fluid from one or more hydraulic pumps (not shown) within the hydrostatic axles 114.

As shown previously in FIGS. 4-6, in some embodiments, when the mower 10 traverses a terrain, or when mower 10 is loaded and unloaded, the main frame 102 can move with respect to the subframe 112. For example, when an operator mounts the mower 10, or if additional weight or equipment is loaded onto the mower 10, the frame 102 can move with respect to the subframe 112. Furthermore, during loading of the mower 10, in some embodiments, the coil spring-type suspension component 126, pivotally coupled to both main frame 102 with the pivot 115, can compress, and the subframe 112 can pivot about the pivot axis 116 on pivot 115. In some embodiments, because the subframe 112 can change the orientation of hydrostatic transaxle 114 during a compressed condition, any direct linkage to hydrostatic transaxle 114 may cause an undesirable actuation of the hydrostatic transaxle pump valve (not shown) if one or more control paddle(s) 134 were to be directly coupled to hydrostatic transaxle 114. Such an undesirable actuation of the hydrostatic transaxle pump valve may be unperceivable when the ZTR mower 10 is moving, however it can become significantly more noticeable when the ZTR mower 10 is in the parked or neutral condition. In the parked or neutral condition, compression of subframe 112 may occur due to operator movement, or some other shifting of weight on the rear of the mower 10. If a direct linkage from control paddle(s) 134 to hydrostatic transaxle 114 was used during such parked or neutral conditions, this weighting of the rear of the mower 10 may cause the linkage to open the hydrostatic transaxle pump valve enough to cause the machine to "lurch" until an unsuspended condition is again reached.

Figure 10B:
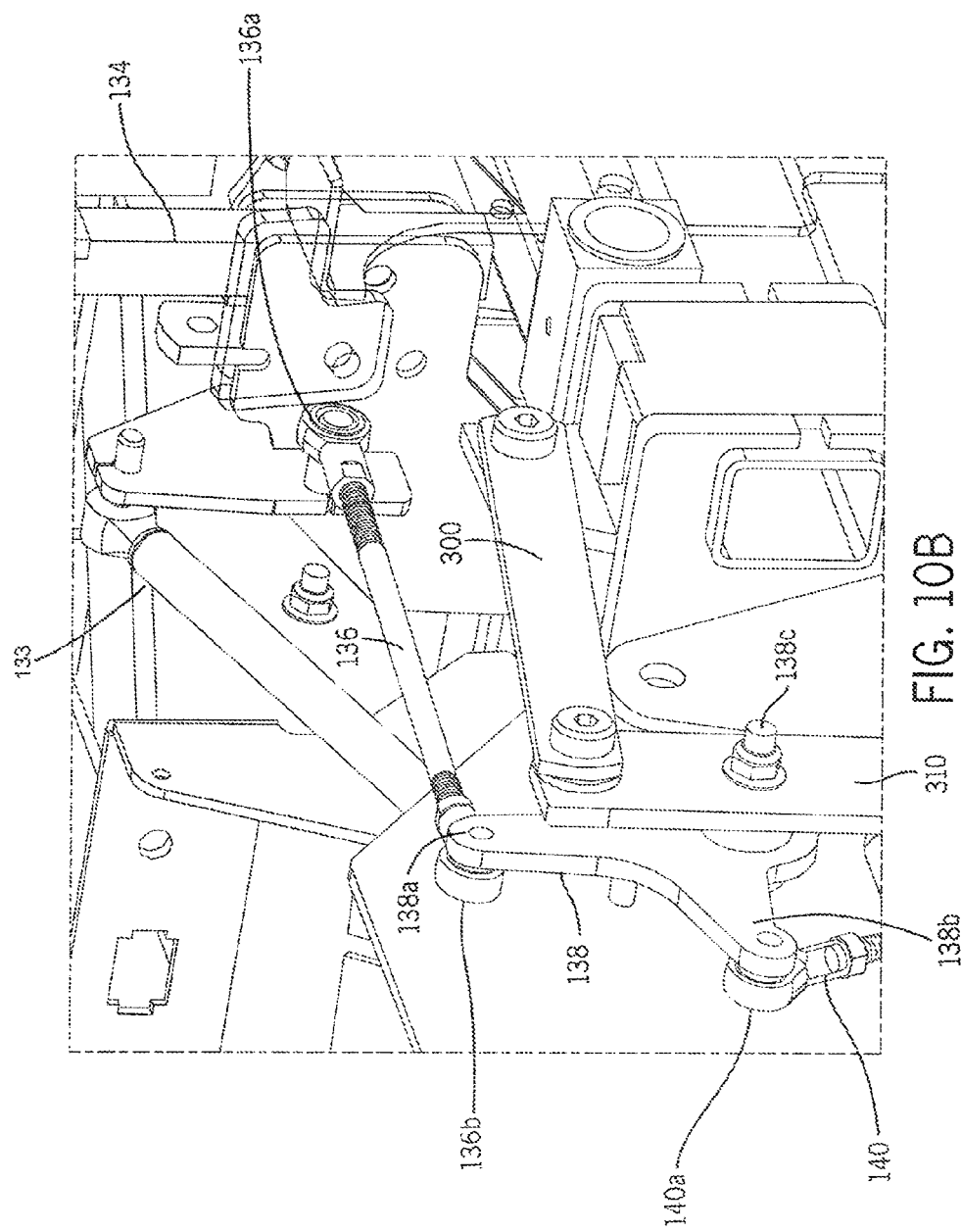
FIG. 10B illustrates a perspective close-up view of the upper portion of the compensated control linkage assembly in accordance with another embodiment of the invention.

In some embodiments of the invention, a compensated control linkage system 133 can be used that comprises a first control linkage 136, including a first end 136a and a second end 136b, wherein the first end 136a is coupled to control paddle assembly 134, and the second end 136b is coupled to a first end 138a of a bell crank 138. In some embodiments, the bell crank 138 is pivotally coupled to a component that is coupled to the subframe 112 via a pivot axis 138c. For example, as shown in FIG. 10b, the bell crank 138 can be pivotally coupled to the compensator arm 310 by pivot point 138c. In some embodiments, a second end 138b of a bell crank 138 can be coupled to a first end 140a of a second control linkage 140. In some further embodiments, the second end 140b of a second control linkage 140 can be coupled to a second bell crank (bell crank 142) used in operation of the hydrostatic transaxle pump valve (not shown). Most notably, in some embodiments, the compensated control linkage system 133 straddles two regions of the mower 10 that are supported around a pivoting component, pivot 115 including pivot axis 116, the main frame 102 and the subframe 112. Some embodiments include a first control linkage 136 coupled via first end 136a to a paddle assembly 134 that is anchored to one region (the main frame 102). Some embodiments also include the second end 136b of first control linkage 136 coupled to a bell crank 138 that is directly coupled to compensator arm 310, which is anchored to the subframe 112. Therefore, in some embodiments, the bell crank 138 interposed between the first control linkage 136 and second control linkage 140 as described above can compensate for movement of subframe 112 and rotation about pivot axis 116.

Figure 8:
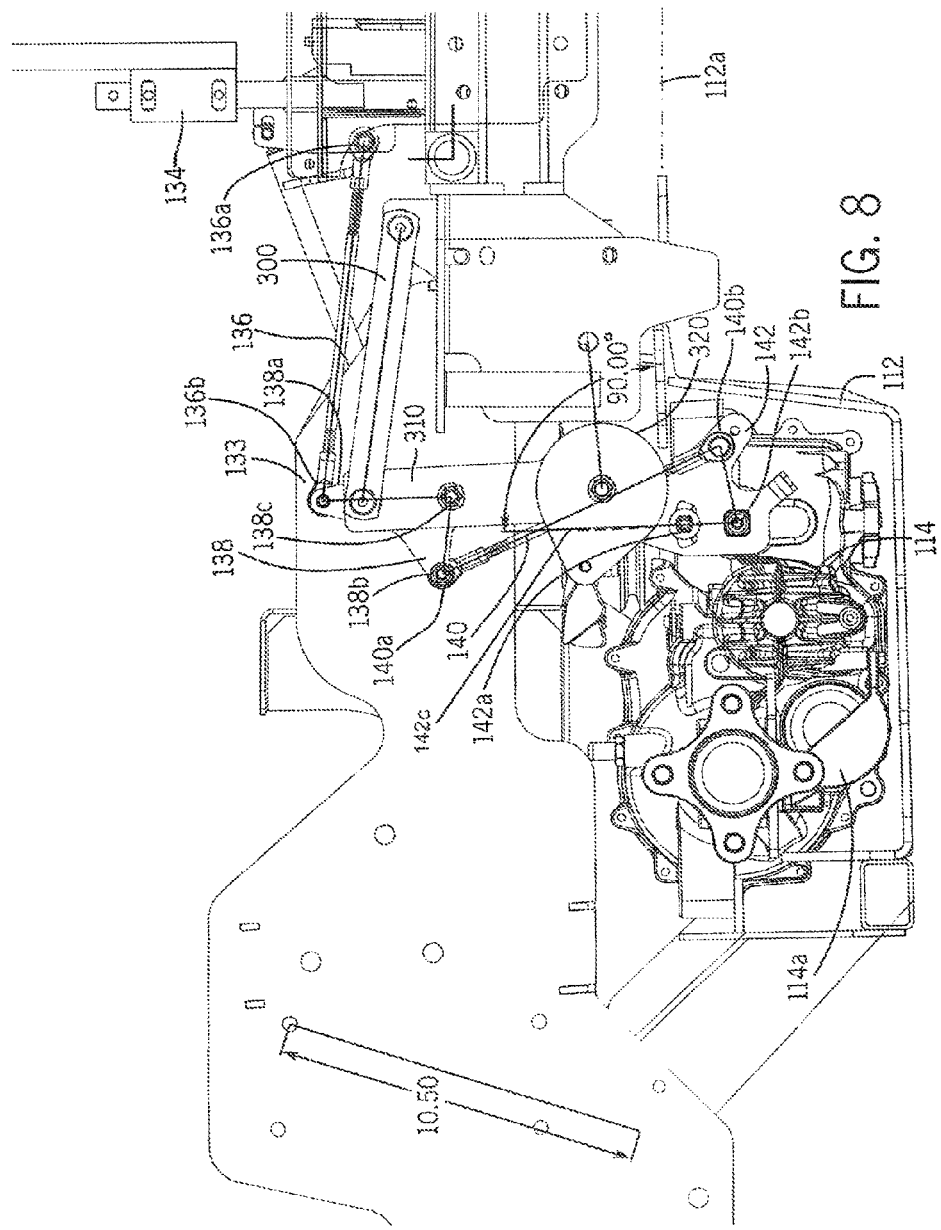
FIG. 8 shows a side sectional view of a hydrostatic transaxle control system in accordance with one embodiment of the invention.
Figure 9:
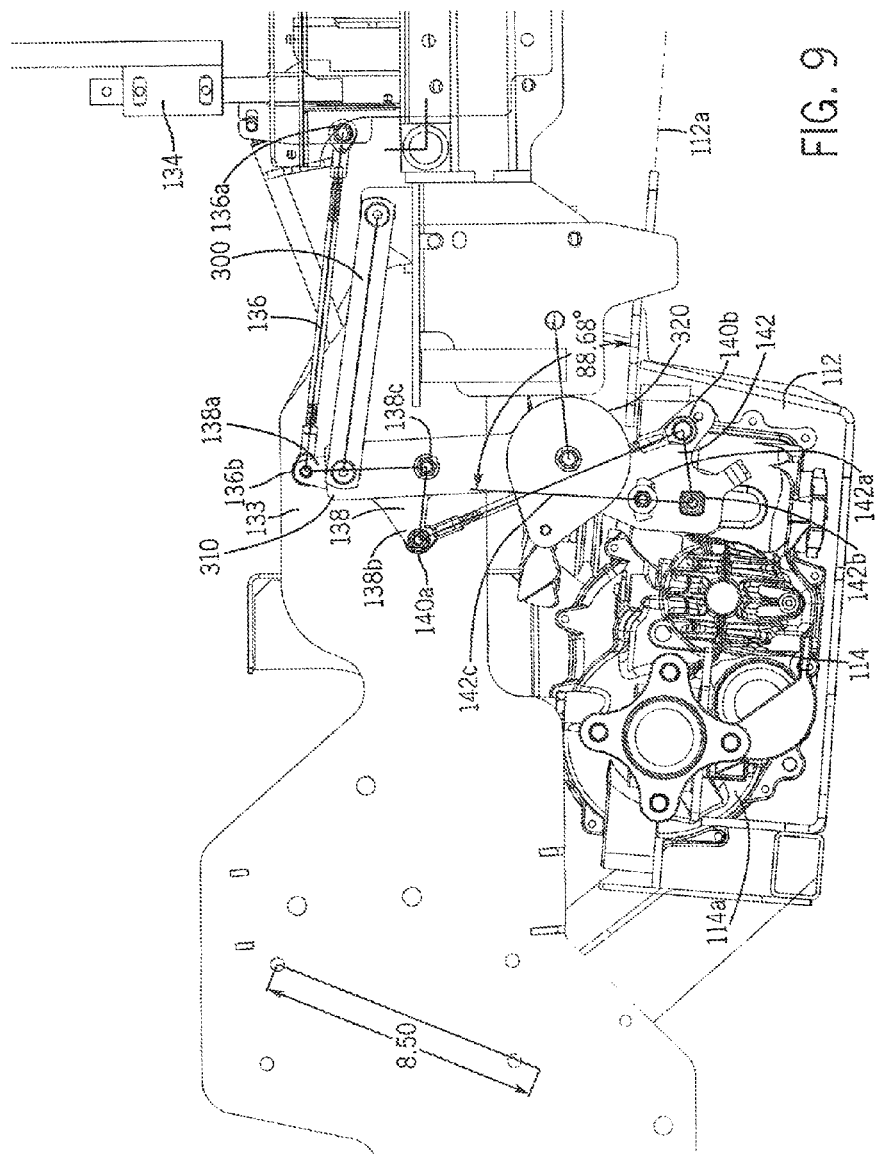
FIG. 9 shows a side sectional view of a hydrostatic transaxle control system in accordance with another embodiment of the invention.

The embodiments as described can be further illustrated in FIG. 8 and FIG. 9 showing detailed side sectional views of the compensated control linkage assembly 133 in accordance with one embodiment of the invention. As shown, FIG. 8 illustrates the mower 10 in an "uncompressed" condition (generally corresponding to the illustration of the suspension system 103 as shown in FIG. 5, showing a suspension component 126 in a generally extended, uncompressed condition). In some embodiments, the shock length of the embodiments shown in FIGS. 8 and 5 can be 10.5 inches, and in this uncompressed condition, a 90 degree reference angle I is achieved between the couplings of bell crank 142 (shown as 142a and 142b) and a first axis 112a on subframe 112. This position signifies a neutral condition of the mower when uncompressed. Conversely, FIG. 9 shows a "compressed" condition of the mower 10 (generally corresponding to the illustration of the suspension system 103 as shown in FIG. 6, showing a suspension component 126 in a generally shortened, compressed condition). In some embodiments, the shock length of the embodiments shown in FIGS. 9 and 6 can be 8.5 inches, and in this compressed condition, an 88.68 degree reference angle I is achieved between operable couplings of bell crank 142 (shown as 142a and 142b, second axis 142c) and the first axis 112a on subframe 112. In some embodiments, this change of angle I of 1.32 degrees between the uncompressed and compressed conditions does not result in the mower "lurching", as discussed above. In some embodiments, the second end 138b of the bell crank 138 is coupled to the first end 140a of the second control linkage 140, and the second end 140b of the second control linkage 140 is coupled to the bell crank 142 coupled to the conventional hydrostatic transaxle pump valve (not shown).

In some embodiments as described, the compensated control linkage system 133 can compensate for movement of the subframe 112. Without this compensation, the degree change between the uncompressed and compressed conditions of the suspension system 103 would be significant enough to cause undesirable movement of the mower in some instances during the parked or neutral condition. While a change of angle I of 1.32 degrees as shown in FIG. 9, it is also possible for a compensated control linkage assembly 133 to be configured to achieve various changes of angle I, dependent upon the hydrostatic transaxle type and style. For example, an angular displacement of less than 1.32 degrees of angle I (e.g., zero degrees or substantially close to zero degrees) could be achieved, or an angular displacement of angle I of greater than 1.32 degrees could be achieved for a hydrostatic transaxle capable of tolerating such a displacement without imparting movement on the drive wheels 104. In some embodiments, the compensated control linkage assembly 133 is configured and arranged to reduce and eliminate the amount of angle I change on the control paddle 134 when the suspension system 103 including a suspension component 126 compresses and decompresses, and the shock length decreases and increases. In some further embodiments (not shown), the amount of angle change can be further reduced or eliminated with other adjustments to the linkage positions and lengths. For example, by adjusting the length and travel distance of the first control linkage 136, the second control linkage 140, and by modifying the rotational circumference of the bell crank 138 or bell crank 142, the amount of change of angle I can be adjusted.

FIG. 10A illustrates a perspective close-up view of the lower portion of the compensated control linkage assembly 133 and FIG. 10B illustrates a perspective close-up view of the upper portion of the compensated control linkage assembly 133. As shown, some embodiments of the invention include a variety of support components. For example, as shown in FIG. 10B, bell crank 138 can be pivotably mounted to compensator arm 310, which is further coupled to compensator link 300. As shown in FIG. 10A, the compensator arm 310 can be coupled to a compensator lock 320. In some other embodiments, the compensated control linkage assembly 133 including first control linkage 136, bell crank 138, second control linkage 140 and bell crank 142 can be coupled to the main frame 102 and the subframe 112 using alternative couplings.

Figure 11:
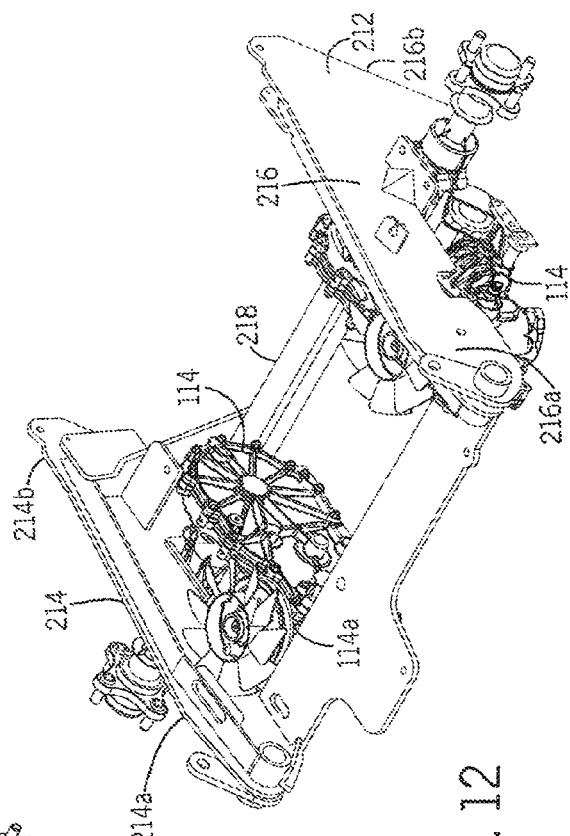
FIG. 11 illustrates a perspective view of a subframe and hydrostatic transaxles in accordance with some embodiments of the invention.
Figure 12:
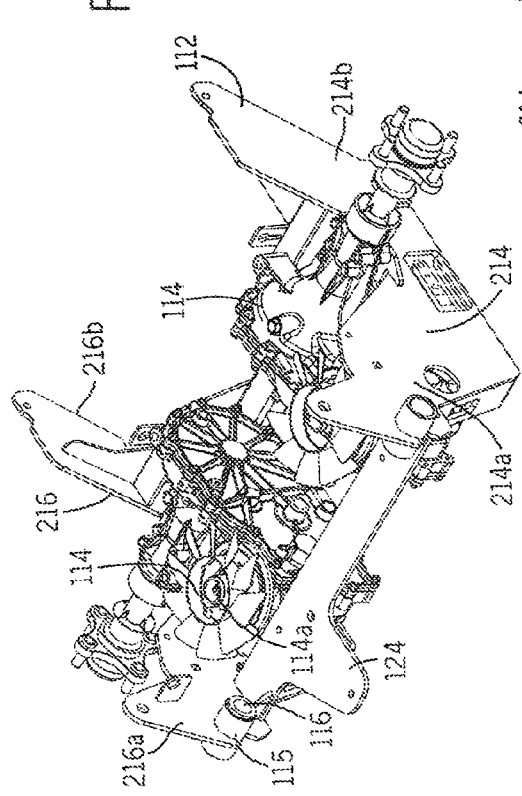
FIG. 12 illustrates a perspective view of a subframe and hydrostatic transaxles in accordance with some embodiments of the invention.

Some embodiments can feature alternative suspension systems 103. For example, referring to FIG. 11, showing a perspective view of the subframe 112 and hydrostatic transaxle 114, the hydrostatic transaxles 114 are mounted to subframe 112 from below. In some other embodiments, as shown in FIG. 12 the hydrostatic transaxles 114 are mounted to a subframe 212 from above, which may account for variations in ZTR mower design, size, etc. Some other embodiments can feature alternative subframe 112 designs and alternative hydrostatic transaxles 114 designs. In some embodiments, the subframe 112 and hydrostatic transaxle 114 can be coupled in other ways. One of ordinary skill in the art will understand that while the illustrated embodiments are directed to ZTR mowers, many embodiments of the invention are equally useful with other types of mowers as well.

As discussed earlier in reference to FIG. 3, illustrating a compressed state of the suspension system 103, in some embodiments, each of the components mounted on subframe 112 rotate about pivot axis 116 when compressed. This includes idler pulley(s) 118, backside idler pulleys 120a, 120b, and driven pulleys 122a,122b on hydrostatic transaxles 114. Hence, in some embodiments, idler pulley(s) 118 and backside idler pulleys 120a,120b travel in the same pulley plane 400 as driven pulleys 122a,122b upon rotation about pivot axis 116. Because the pulleys 118, 120a, 120b travel in the same pulley plane 400, in some embodiments, the change in the belt 132 angle is minimized when the subframe 112 travels through its suspension arc, and therefore belt 132 misalignment is also minimized. As described earlier, if the idler pulleys 118, 120a, 120b were to travel or rotate about a different plane than driven pulley 122a,122b (i.e. pulley plane 400) on hydrostatic transaxle 114, then significant belt 132 misalignment (caused by a belt 132 angle change) may encourage the belt 132 to "jump" off of the pulley system, thereby rendering the system inoperable. However, as described earlier in FIGS. 2 and 3, in some embodiments, the only belt 132 angle change between pulleys in the present embodiment would be between backside idler pulleys 120a, 120b and drive pulley 110 mounted to the power take-off shaft 109. The risk of belt 132 "jump" due to misalignment is greatly diminished under this configuration because there is a significant distance between backside idler pulleys 120*a*, 120*b* and drive pulley 110, thereby minimizing the belt 132 angle change when subframe 112 travels through its suspension arc (i.e. during a change of angle I). Furthermore, the significant distance between the drive pulley 110 and the backside idler pulleys 120*a*, 120*b* maintains the angle of the endless belt 132 to 3 degrees or less, and prevents belt 132 misalignment between these pulleys when subframe 112 travels through its suspension arc. Moreover, backside idler pulleys 120*a*,120*b* have a higher tolerance for belt 132 angle changes during operation than other types of pulleys.

Figure 13:
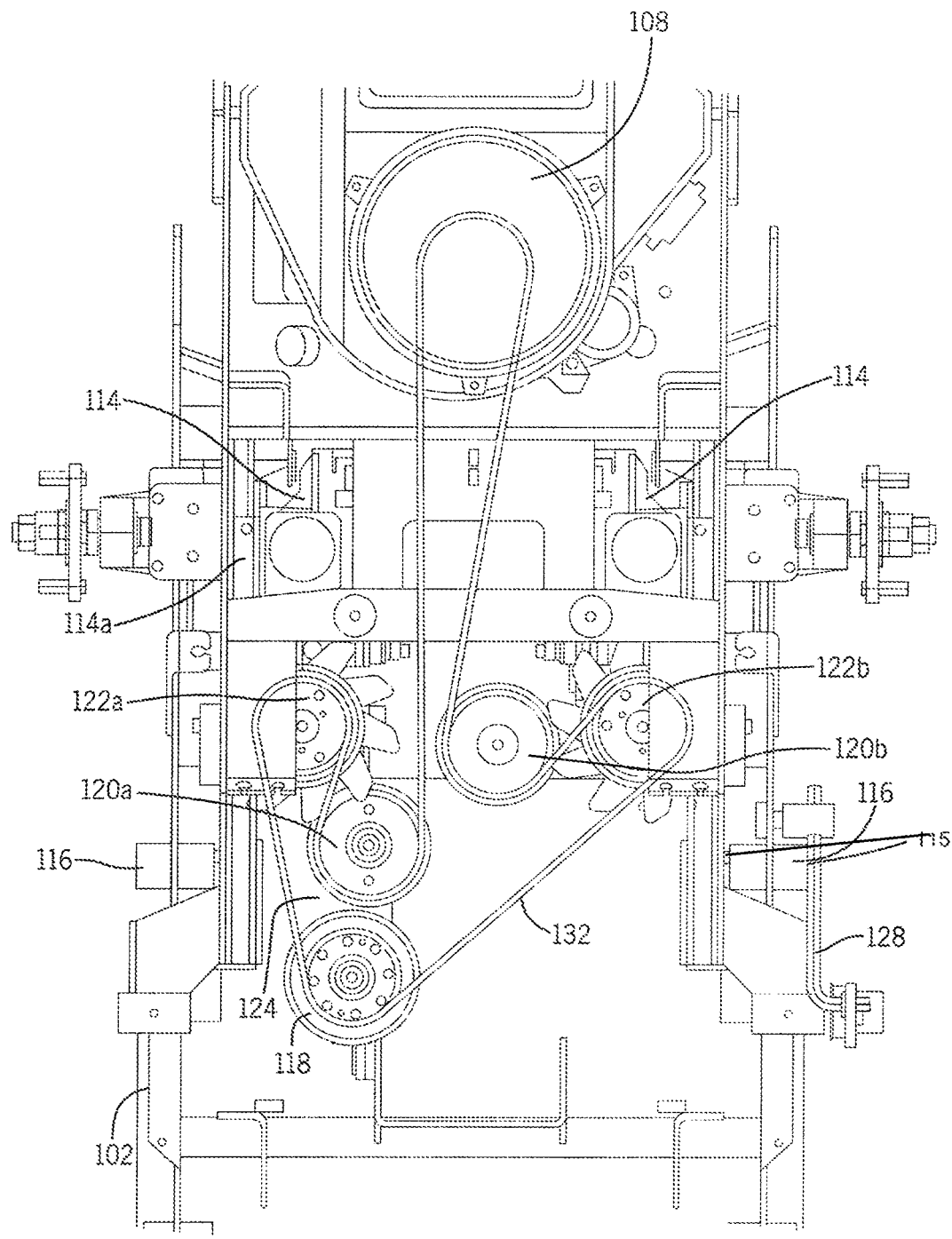
FIG. 13 illustrates a top sectional view of the hydrostatic transaxle drive system components in accordance with some embodiments of the invention.

Some embodiments of the invention can be seen in FIG. 13, showing a top sectional view of the hydrostatic transaxle drive system components, including further details of the pulley and belt drive assembly 117. Specifically, FIG. 13 shows the location of the backside idlers 120*a*,120*b* and their positional relationship with the engine 108, and the drive pulley 110 (illustrated as endless belt 132 curvature over the engine 108) according to some embodiments of the invention. As shown, in some embodiments, the endless belt 132 can be coupled between the drive pulley 110 coupled to an internal combustion engine 108, backside idler pulleys 120*a*, 120*b*, idler pulley 118, and driven pulley 122*a*,122*b* on hydrostatic transaxle 114. As detailed above, backside idler pulleys 120*a*,120*b*, idler pulley 118, and driven pulleys 122*a*,122*b* on hydrostatic transaxle 114 each travel in the same pulley plane 400 while the subframe 112 travels about its suspension arc. Thus, in some embodiments, the only change in angle of endless belt 132 occurs between drive pulley 110 coupled to internal combustion engine 108 and backside idler pulley 120*a*,120*b*. However, in some embodiments, because of the significant distance between drive pulley 110 and backside idler pulleys 120*a*,120*b*, made possible by the placement of backside idler pulleys 120*a*, 120*b* near pivot 115 and pivot axis 116 on suspended subframe 112, the change in belt 132 angle during suspended operation is minimized. Accordingly, the likelihood of belt slip or "jump" due to belt 132 angle change is also minimized.

Figure 14A:
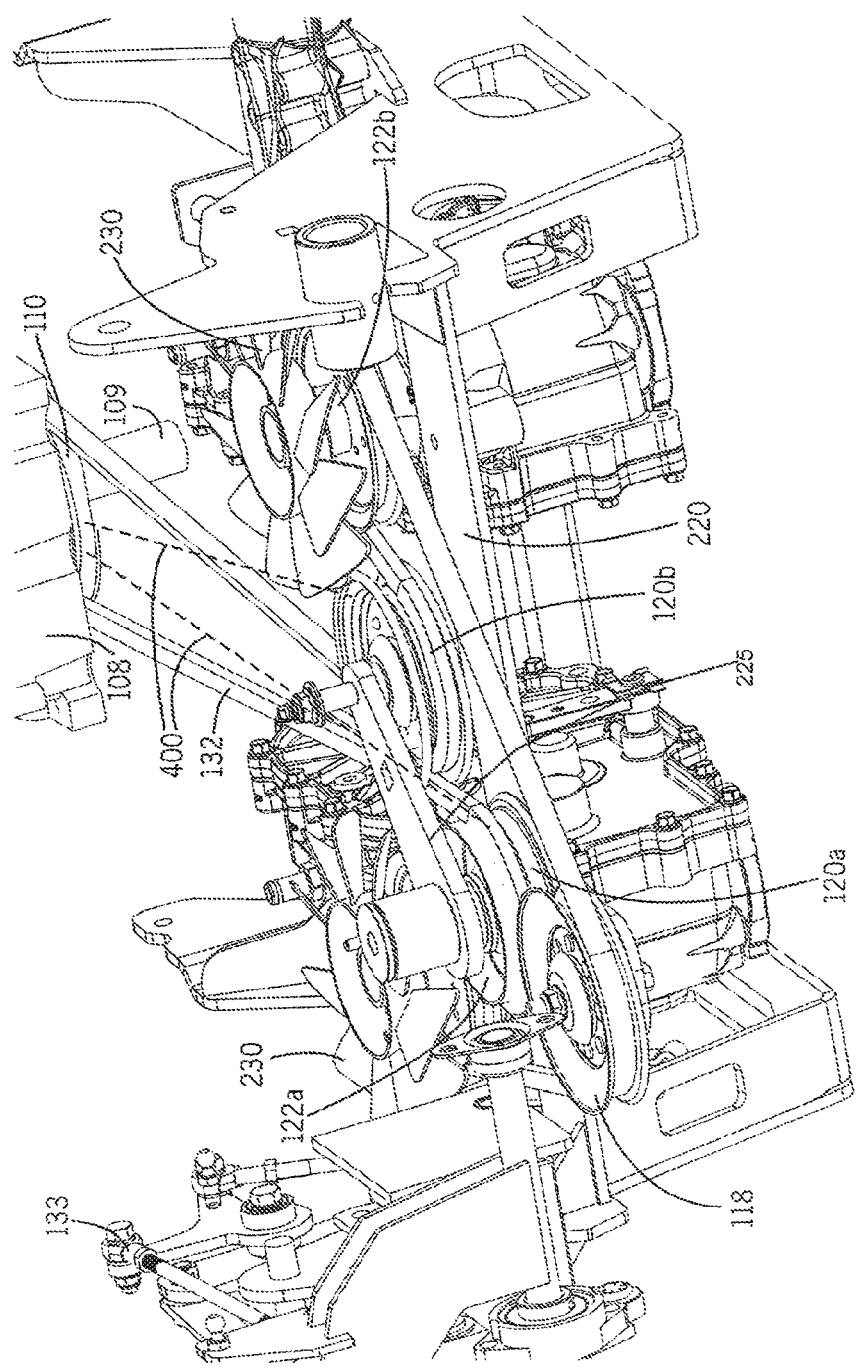
FIG. 14A illustrates a close-up perspective view of a hydrostatic transaxle drive system in accordance with some embodiments of the invention.
Figure 14B:
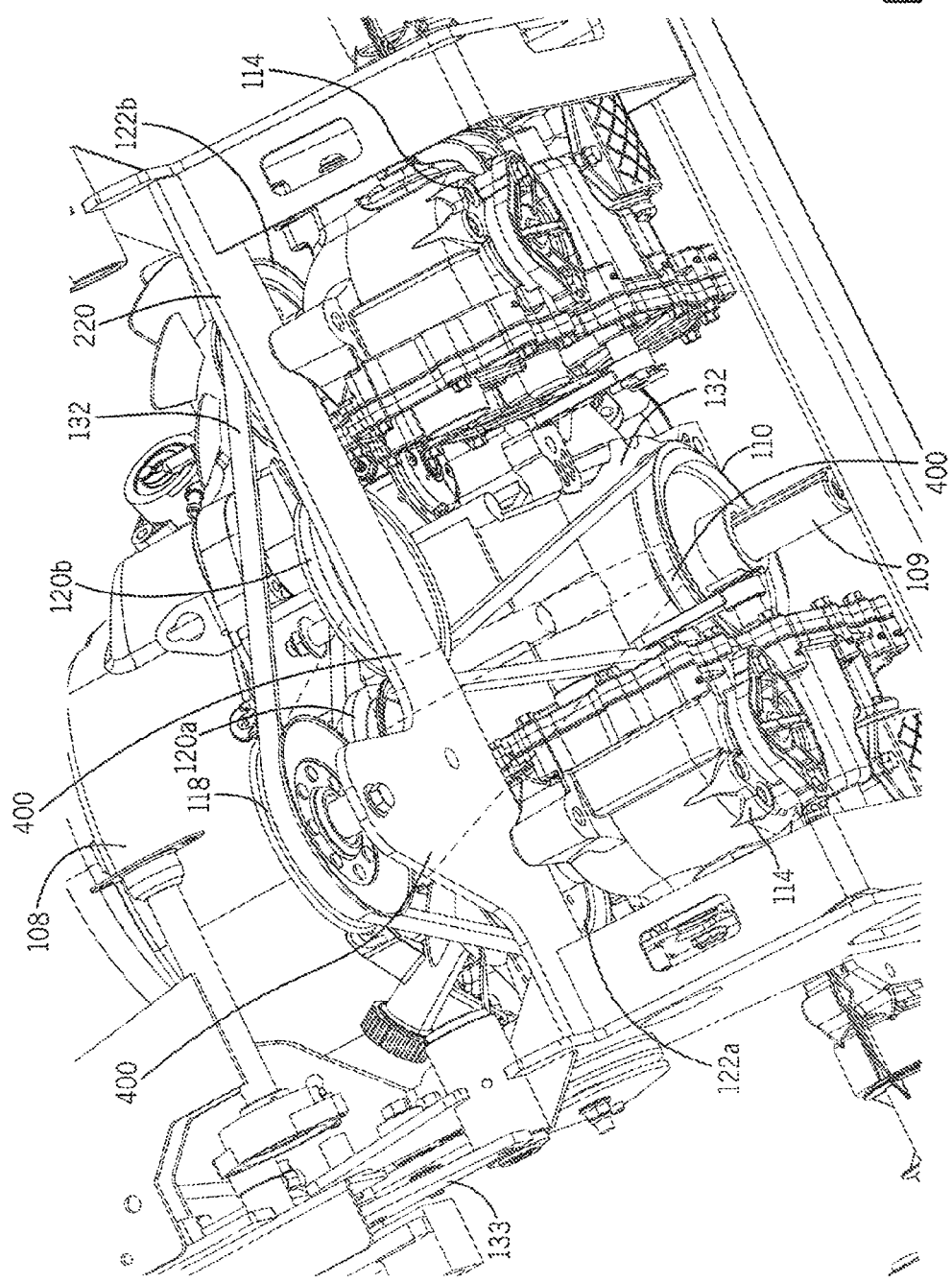
FIG. 14B illustrates a close-up perspective view of a hydrostatic transaxle drive system in accordance with some embodiments of the invention.

Further views of the various hydrostatic transaxle drive system components including the pulley and belt drive assembly 117 can be seen in FIGS. 14A and 14B. As shown, in some embodiments, one or more hydraulic drive systems can comprise a drive pulley 110, coupled to a power take-off shaft 109, coupled to an engine 108. In some embodiments, the drive pulley 110 can be coupled to one or more pulley and idle pulleys coupled to one or more hydrostatic transaxles 114. For example, as shown in FIGS. 14A and 14B, in some embodiments, the drive pulley 110 can be coupled to backside idler pulleys 120*a*,120*b*, driven pulleys 122*a*,122*b*, and belt idler pulley 118, all of which can be positioned a significant distance from the drive pulley 110.

In some embodiments, idler pulley(s) 118 and backside idler pulleys 120*a* and 120*b* are attached to the subframe 112 via a conventional spindle (not shown) to allow rotation of the pulleys. In some other embodiments, they can be attached via a plate 124 to front suspension mount 220. In some embodiments, idler pulley(s) 118 and backside idler pulleys 120*a*, 120*b* receive an endless belt 132 (not shown) that is driven by drive pulley 110 on the power take-off shaft 109 of internal combustion engine 108. In some further embodiments, the endless belt 132 is also received by driven pulleys 122*a*, 122*b* coupled to the hydraulic pump (not shown) of hydrostatic transaxle 114. As described earlier, in some embodiments, the only belt 132 angle change between pulleys in the present embodiments would be between backside idler pulleys 120*a*, 120*b*, and drive pulley 110 mounted to the power take-off shaft 109. As previously described, the significant distance between backside idler pulleys 120*a*, 120*b* and drive pulley 110 minimizes the belt 132 angle change when subframe 112 travels through its suspension arc.

As described previously, in some embodiments, the ZTR mower 10 includes at least one power source such as an internal combustion engine 108, and in some embodiments, the internal combustion engine 108 can power a take-off shaft 109 coupled to at least one hydrostatic transaxle 114 via an endless belt 132. In alternative embodiments, the at least one power source can include a current source and the ZTR mower 10 can be driven through the rear drive wheels 104 by at least one electric drive assembly (not shown). For example, in some embodiments, a current source comprising at least one battery (not shown) can be supported by the main frame 102 and be capable of being electrically coupled to at least one conventional electric drive assembly (not shown) including at least one electric motor (not shown). In some embodiments, the at least one battery can be electrically coupled to the at least one electric motor using at least one electrical harness (not shown).

In some embodiments, the at least one power source can include at least one rechargeable battery. In some embodiments, the at least one rechargeable battery can be at least partially charged from an external power supply. For example, in some embodiments, the ZTR mower 10 can included a main frame 102 supporting at least one rechargeable battery that can be at least partially charged from an electrical outlet or another source of electricity. In some other embodiments, the ZTR mower 10 can include an onboard power supply. For example, in some embodiments, the ZTR mower 10 can include rechargeable battery supported by the main frame 102 that can be at least partially charged from an internal combustion engine 108. In some embodiments, the engine 108 can be electrically coupled to at least one onboard current generator or an alternator (not shown) powered by the engine 108. In some embodiments, the onboard current generator can be capable of at least partially recharging the at least one battery. In some other embodiments, the onboard current generator can be at least partially able to power the at least one electric motor independently, or via the at least one rechargeable battery. In some embodiments, the at least one rechargeable battery resides within the subframe 112, and the engine 108 is resides outside of the subframe 112, supported on the main frame 102. In some other embodiments, the engine 108 can be electrically coupled to at least one onboard current generator powered by the engine 108, further coupled to at least one rechargeable battery mounted to the subframe. In some embodiments, the rechargeable battery can be recharged by the engine 108 via the current generator.

Some embodiments of the invention include a subframe 112 pivotally coupled to a main frame 102 about a pivot axis of a ride-on equipment that includes at least one electric motor supported by the subframe 112. In some embodiments, the at least one electric motor is electrically coupled to at least one battery positioned external to the subframe 112 and supported by the main frame 102. In some embodiments, the electric motor is configured and arranged to be powered by the at least one battery for driving at least one wheel 104 and the pivot axis resides substantially between the at least one electric motor and the at least one battery.

In some other embodiments, the ZTR mower 10 can include at least one drive shaft (not shown) coupled to at least one drive wheel 104. In some embodiments, the main frame 102 includes at least one at least one power source such as an internal combustion engine 108, and in some embodiments, the engine 108 can be coupled to the drive shaft. Some embodiments of the invention include a subframe 112 pivotally coupled to a main frame 102 about a pivot axis of a ride-on equipment. In some embodiments, the engine 108, supported by the main frame 102, but unsupported by the subframe 112, is coupled to at least one wheel 104 coupled to the subframe 112. In some embodiments, the at least one wheel is driven by the drive shaft coupled to the engine 108 and the pivot axis resides substantially between the at least one wheel and the engine 108.

In some alternative embodiments of the invention, the subframe 112 can be formed from two separate pivotal platforms, one for each hydrostatic transaxle, to allow for independent suspension of each drive wheel. Further, embodiments of the invention that include an independent suspension of each drive wheel, other variations in the pulley arrangement can be included to account for movement of two separate pivotal platforms. For example, in reference to FIGS. 15-23, some embodiments include an alternative suspension system 1103 that can include two independent first and second subframes 1112a, 1112b each separately coupled to a main frame 1102. This arrangement can enable each hydrostatic transaxle to be mounted on a separate subframe so that any coupled drive wheel can respond to motion and suspension forces independently.

Figure 15:
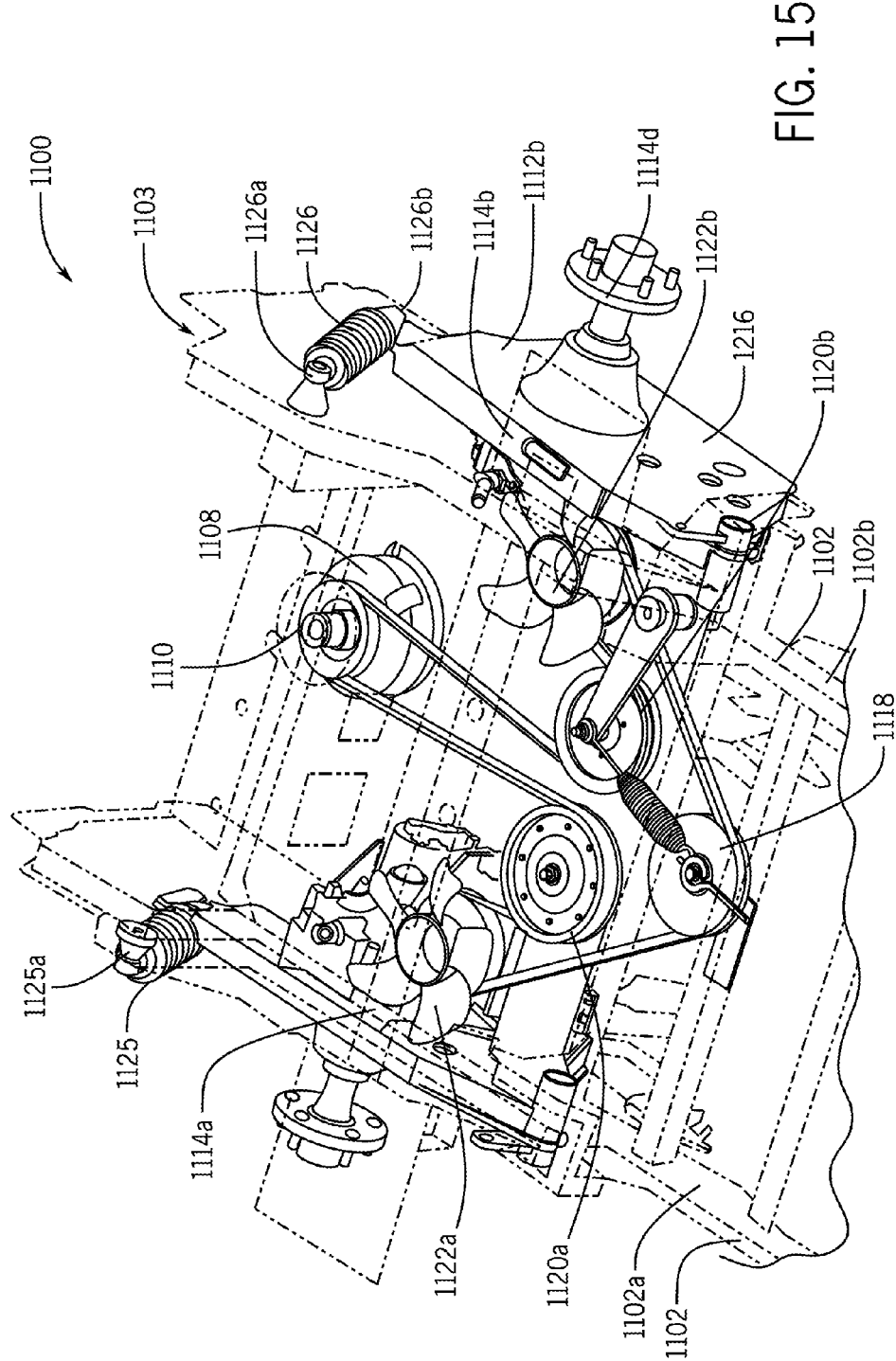
FIG. 15 illustrates a partially transparent perspective view of a portion of a suspension system of a ZTR mower in accordance with some embodiments of the invention.

FIG. 15 illustrates a partially transparent perspective view 1100 of a portion of a suspension system 1103 of a ZTR mower 10 in accordance with some embodiments of the invention. For ease of understanding, many conventional components commonly present in ZTR mowers (e.g., control handles, seat, mower deck, etc.) have been omitted from FIG. 15. However, one of ordinary skill in the art will readily understand that such conventional components may be included in the embodiments described herein. In some embodiments, the suspension system 1103 comprises a main frame 1102 that can support the front and rear wheels of a mower (e.g., such as both the front caster wheels 106 and the rear drive wheels 104 of ZTR mower 10.) In this instance, the main frame 1102 can be used in place of the main frame 102 within the ZTR mower 10 to support an internal combustion engine 1108, along with one or more drive systems that can be configured to operate to move the ZTR mower 10 (e.g., using drive wheels 104). Further, the main frame 1102 can support other primary components, as well as one or more auxiliary components attached to the ZTR mower 10, such as the cutting blades of the front cutter assembly 30 (shown in FIG. 1).

Figure 16:
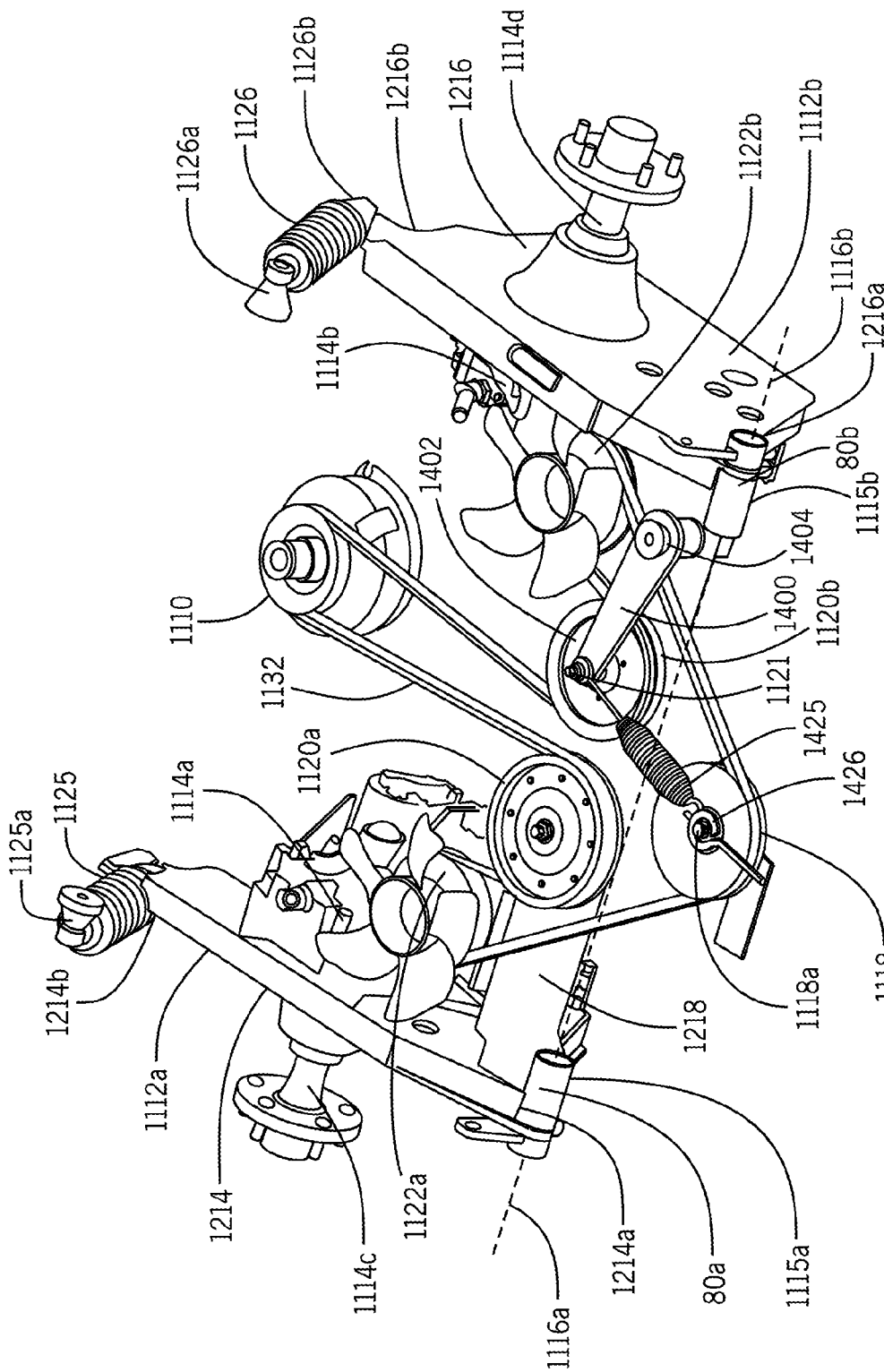
FIG. 16 illustrates a perspective view of components of a suspension system of a ZTR mower in accordance with some embodiments of the invention.
Figure 17:
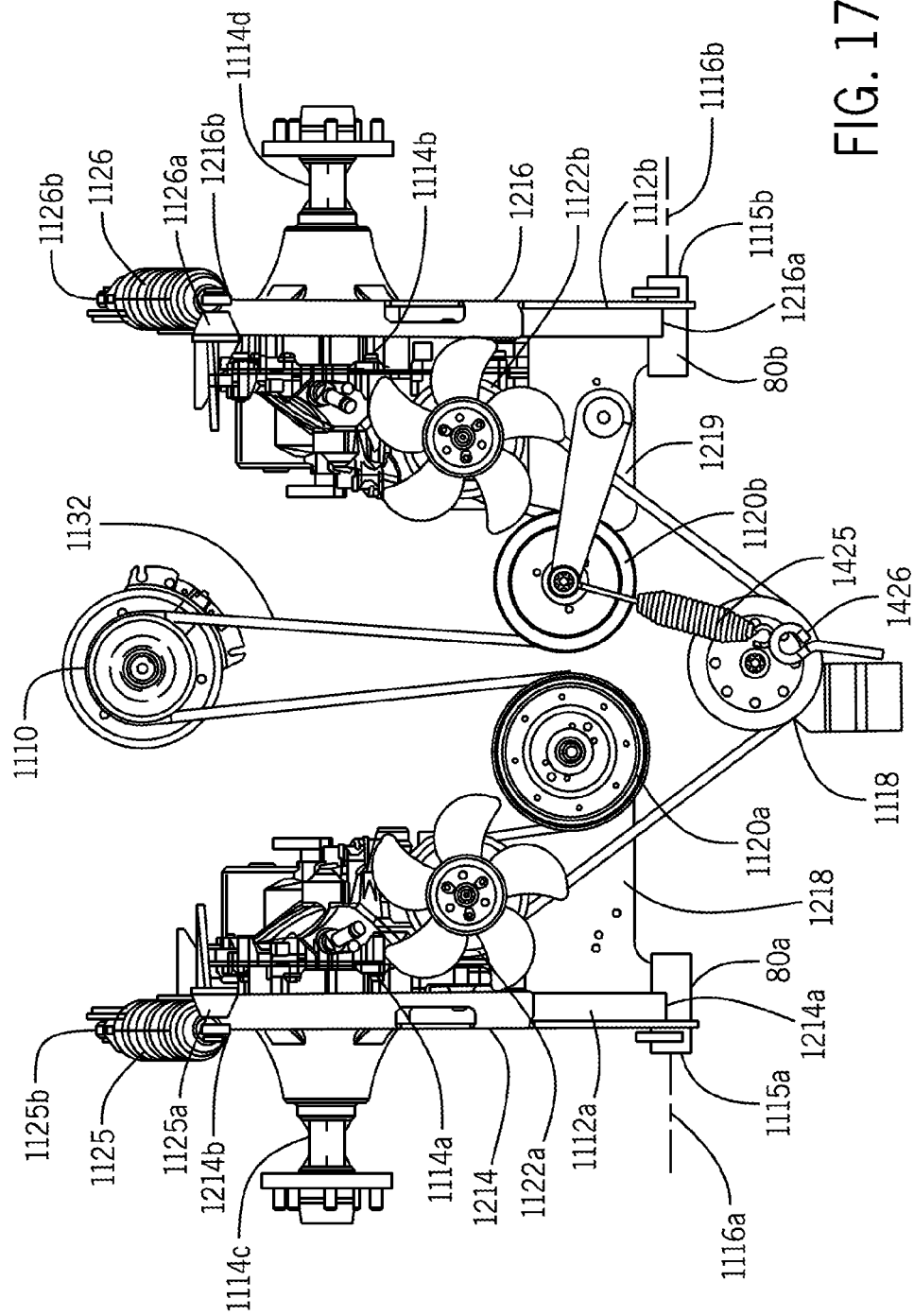
FIG. 17 illustrates a top view of components of a suspension system of a ZTR mower in accordance with some embodiments of the invention.

FIG. 16 illustrates a perspective view of components of the suspension system 1103 of a ZTR mower 10 in accordance with some embodiments of the invention, and FIG. 17 illustrates a top view of components of the suspension system 1103 of a ZTR mower 10 in accordance with some embodiments of the invention. In some embodiments, the suspension system 1103 can include a first subframe 1112a coupled to a side 1102a of the main frame 1102. In some embodiments, the first subframe 1112a can comprise a support member 1214 including a first end 1214a and a second end 1214b. In some embodiments, the first subframe 1112a can be pivotally mounted to the main frame 1102 to allow for translational movement of the subframe 1112a with respect to the main frame 1102. In some embodiments, a pivot 1115a can be located proximate the first end 1214a that can enable the first subframe 1112a to pivot around the pivot axis 1116a when coupled to a portion or region of the main frame 1102. Thus, in some embodiments, the first subframe 1112a, and anything supported by the first subframe 1112a, can be allowed to pivot about the main frame 1102 on a pivot axis 1116a using the pivot 1115a.

In some embodiments, the suspension system 1103 can include another subframe independent of the first subframe 1112a. For example, in some embodiments, the suspension system 1103 can include a second subframe 1112b coupled to another and/or opposite side of the main frame 1102 (side 1102b). In some embodiments, the second subframe 1112b can comprise a support member 1216 including a first end 1216a and a second end 1216b. In some embodiments, the second subframe 1112b can be pivotally mounted to the main frame 1102 to allow for translational movement of the subframe 1112b with respect to the main frame 1102. In some embodiments, a pivot 1115b can be positioned proximate the first end 1216a. The pivot 1115b can enable the second subframe 1112b to pivot around a pivot axis 1116b when coupled to a portion or region of the main frame 1102. Thus, in some embodiments, the second subframe 1112b, and anything supported by the second subframe 1112b, can be allowed to pivot about the main frame 1102 on a pivot axis 1116b using the pivot 1115b.

Figure 18:
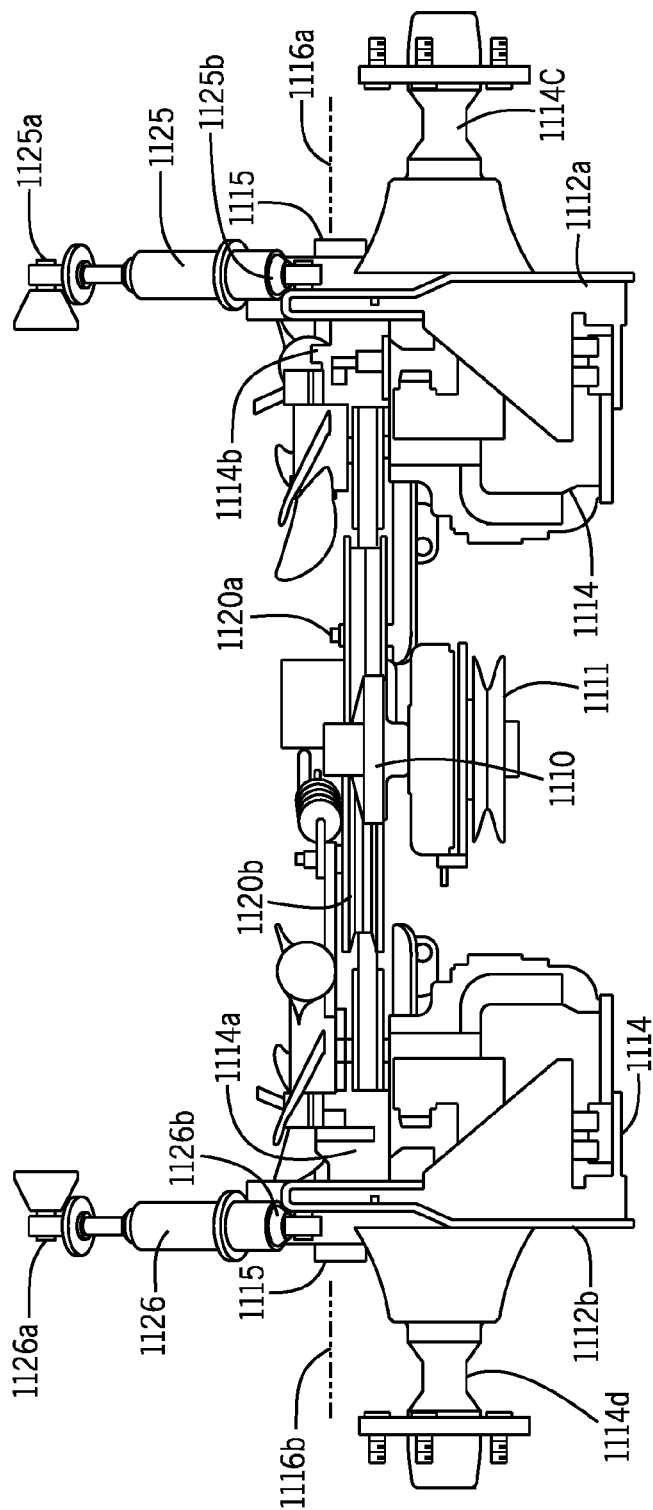
FIG. 18 illustrates an end view of a suspension system of a ZTR mower in accordance with some embodiments of the invention.
Figure 19:
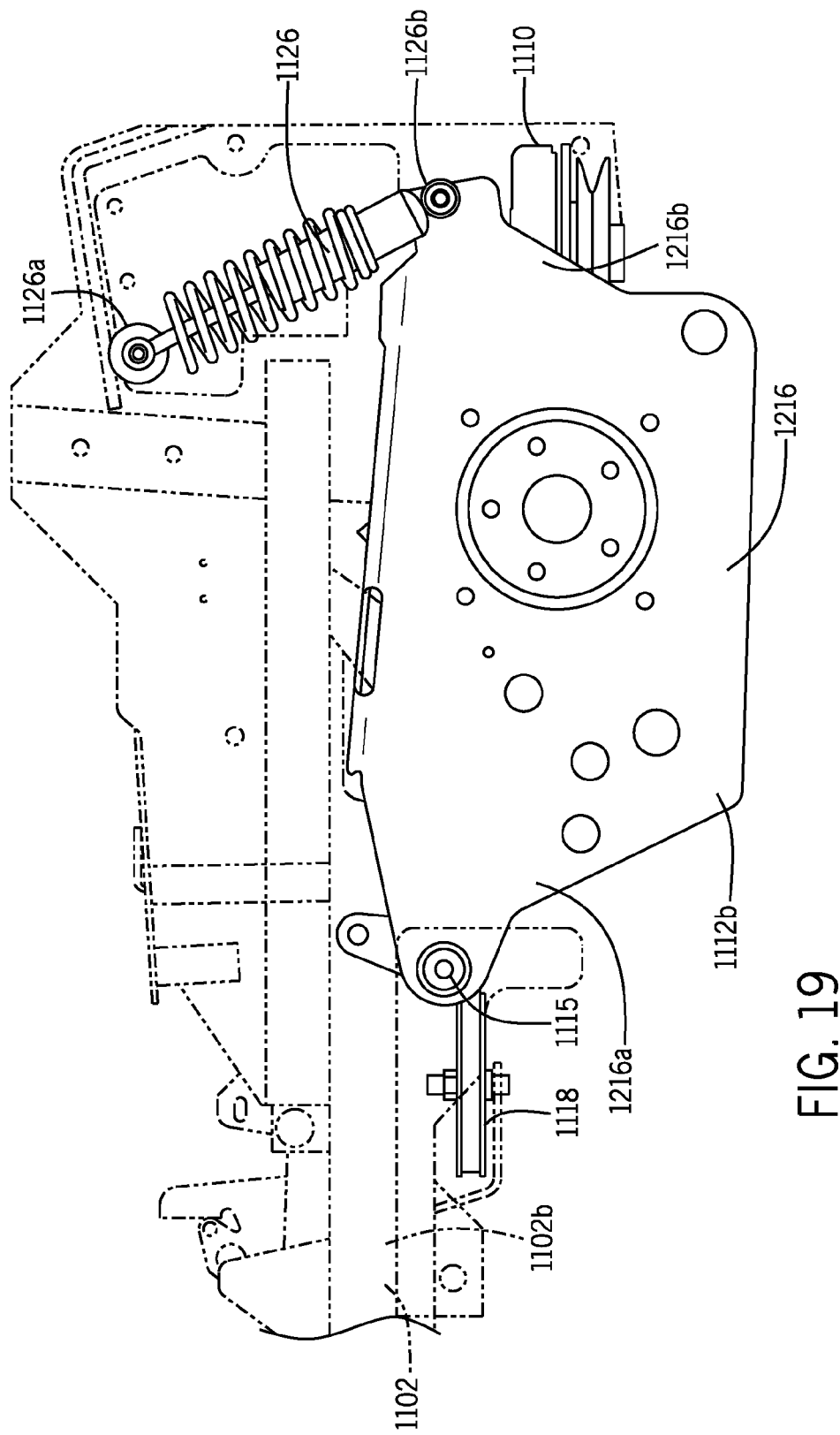
FIG. 19 illustrates a side view of a suspension system of a ZTR mower in accordance with some embodiments of the invention.
Figure 20:
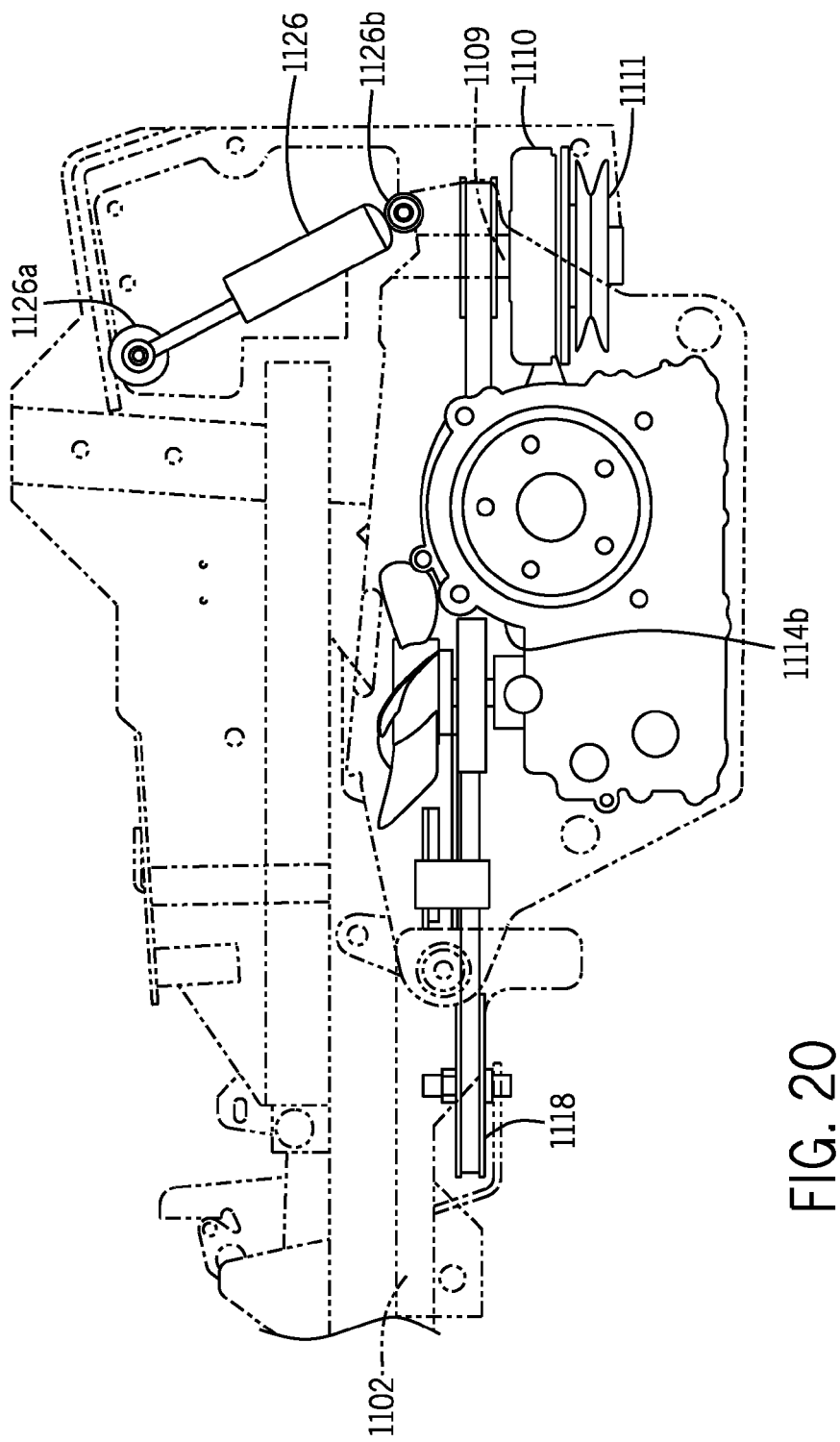
FIG. 20 illustrates a partially transparent side view of a suspension system of a ZTR mower in accordance with some embodiments of the invention.
Figure 21:
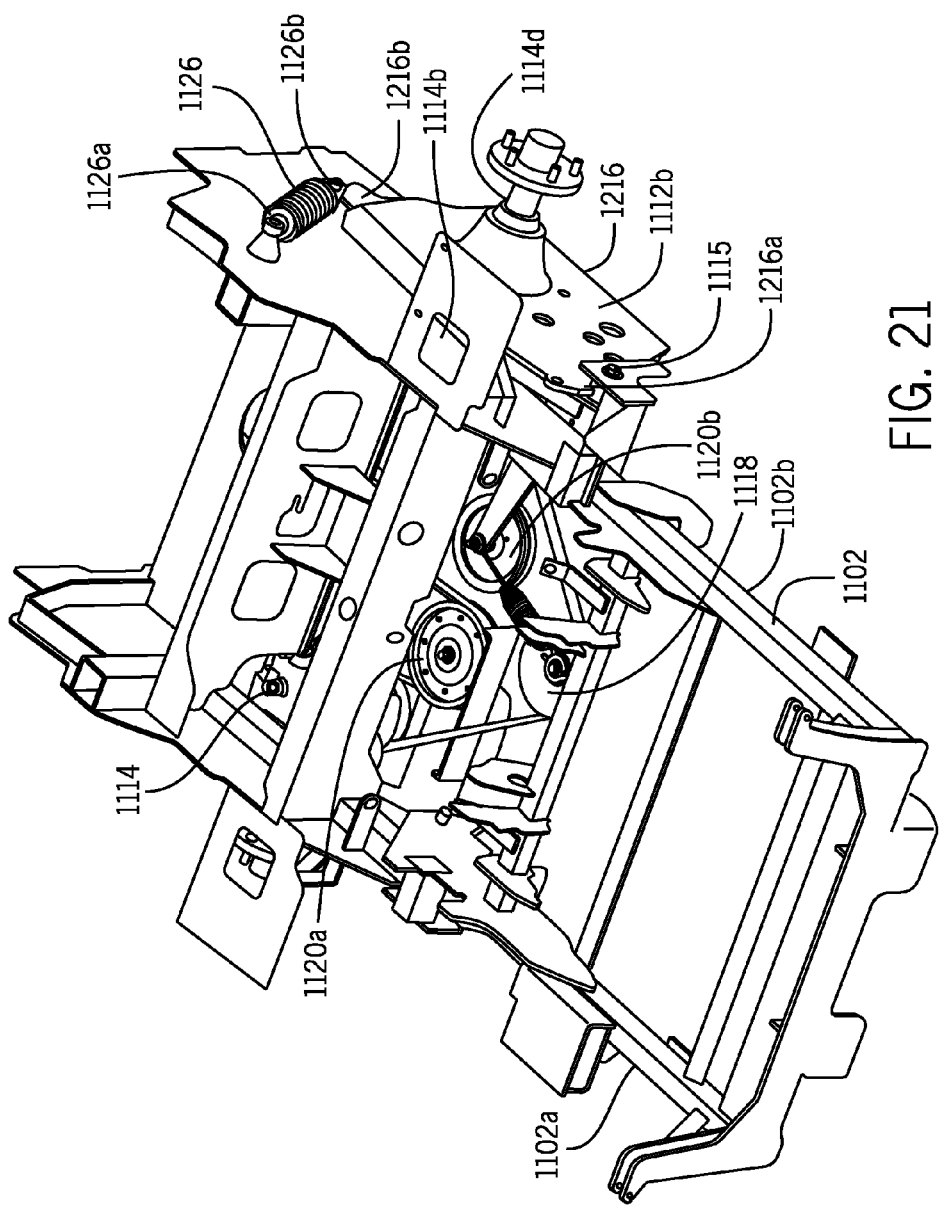
FIG. 21 illustrates a perspective view of a suspension system of a ZTR mower in accordance with some embodiments of the invention.
Figure 22:
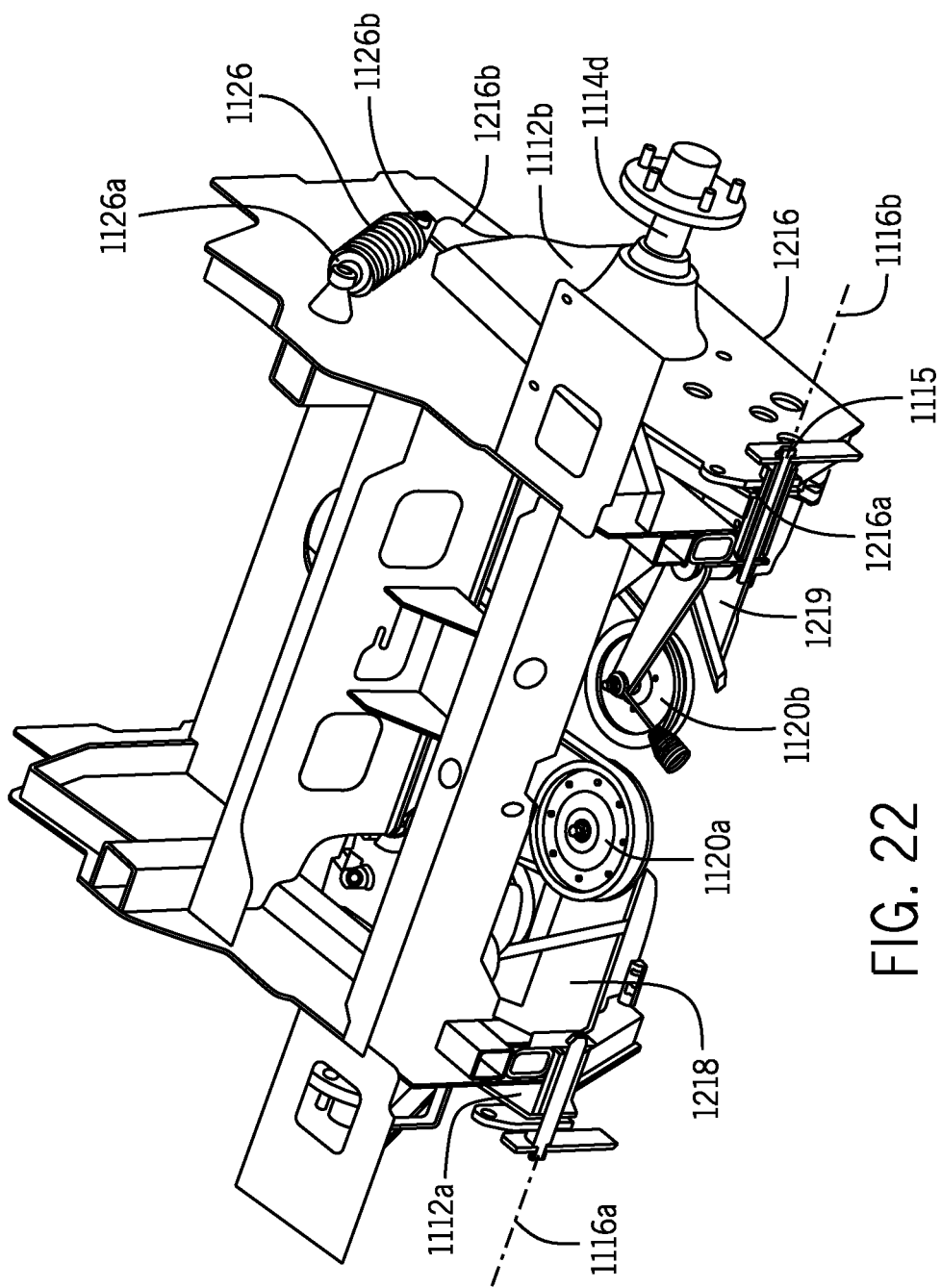
FIG. 22 illustrates a close up perspective view of a portion of a suspension system of a ZTR mower in accordance with some embodiments of the invention.

The position and coupling of the first and second subframes 1112a, 1112b to the main frame 1102 can be further illustrated in FIGS. 18-22. For example, FIG. 18 illustrates an end view of a suspension system 1103 of a ZTR mower 10 in accordance with some embodiments of the invention. FIG. 19 illustrates a side view of a suspension system 1103 of a ZTR mower 10 in accordance with some embodiments of the invention. Further, FIG. 20 illustrates a partially transparent side view of a suspension system 1103 of a ZTR mower 10 in accordance with some embodiments of the invention. FIG. 21 illustrates a perspective view of a suspension system 1103 of a ZTR mower 10, and FIG. 22 illustrates a close up perspective view of a portion of a suspension system 1103 of a ZTR mower 10 in accordance with some embodiments of the invention. Some views show the suspension system 1103 including pivot axis 1116a of the first subframe 1112a, and pivot axis 1116b of the separate second subframe 1112b. In some embodiments, the pivots 1115a, 1115b can be positioned on opposite sides of the main frame 1102 so that the pivot axis 1116a, 1116b are aligned and/or are substantially equal. In some other embodiments, the pivots 1115a, 1115b can be positioned on opposite sides of the main frame 1102 so that the pivot axis 1116a, 1116b at least partially overlap. In some further embodiments of the invention, the pivots 1115a, 1115b can be positioned on opposite sides of the main frame 1102 so that there is no overlap or alignment of the pivot axis 1116a, 1116b.

In some embodiments, either or both of the first and second subframes 1112a, 1112b can be further coupled to a motion absorbing suspension component. In some embodiments, the motion absorbing suspension component can include a compressible suspension component such as a coil spring-type suspension component alternative, e.g., rubber and/or other elastomeric polymer, one or more dampeners, hydraulics, flexures, one or more air or other gas cushions, a spring only, dampener only, etc. For example, in some embodiments, the second end 1214b of the support member 1214 can couple to a region of the main frame 1102 through a coil spring-type suspension component 1125. In some embodiments, the coil spring-type suspension component 1125 can comprise a second end 1125b coupled to the second end 1214b of the support member 1214. Further, in some embodiments, a first end 1125a of the coil spring-type suspension component 1125 can couple to a portion of the main frame 1102. In some further embodiments, the second end 1216b of the support member 1216 can couple to another portion or region of the main frame 1102 through a coil spring-type suspension component 1126. In some embodiments, the coil spring-type suspension component 1126 can comprise a second end 1126b coupled to the second end 1216b of the support member 1216, and a first end 1126a of the coil spring-type suspension component 1126 can couple to a region of the main frame 1102.

In some embodiments, either or both of the first and second subframes 1112a, 1112b can support one or more transaxle assemblies. In some embodiments, one or more of the transaxle assemblies can be driven or powered by the engine 1108 using one or more drive pulleys, including a drive pulley 1110 driven by the engine 1108 via a power take off shaft 1109. In some embodiments, the transaxle assemblies can contain both a hydraulic pump, a hydraulic valve (not shown), and a hydraulic motor (not shown) for powering the drive wheels 104 of the ZTR mower 10. For example, in some embodiments, a hydrostatic transaxle 1114a can be coupled to the first subframe 1112a. In some embodiments, a hydrostatic transaxle 1114a can be coupled to the support member 1214 between the first end 1214a and the second end 1214b. In some embodiments, a portion of the hydrostatic transaxle 1114a or a coupled component of the hydrostatic transaxle 1114a can pass through the support member 1214 to drive and/or support a driving component such as a wheel. For example, in some embodiments, a drive axle 1114c can pass through the support member 1214 to enable a drive wheel to be coupled to the drive axle 1114c. Further, in some embodiments, a hydrostatic transaxle 1114b can be coupled to the second subframe 1112b adjacent or proximate the opposite side of the main frame 1102. In some embodiments, a hydrostatic transaxle 1114b can be coupled to the support member 1216 between the first end 1216a and a second end 1216b. In some embodiments, a portion of the hydrostatic transaxle 1114b or a coupled component of the hydrostatic transaxle 1114b can pass through the support member 1216. For example, in some embodiments, a drive axle 1114d can pass through the support member 1216 to drive and/or support a driving component such as a wheel. In some further embodiments, auxiliary components attached to the ZTR mower 10 (such as the cutting blades) can be driven via one or more drive pulleys, including an auxiliary drive pulley 1111 driven by the engine 1108 via a power take off shaft 1109 (see FIG. 20).

In some embodiments, the engine 1108 can drive or power either or both of the hydrostatic transaxles 1114a, 1114b using a drive pulley 1110 driven by the engine 1108. For example, referring to FIGS. 16 and 17, in some embodiments, the drive pulley 1110 can drive either or both of the hydrostatic transaxles 1114a, 1114b with the assistance of one or more pulleys mounted to portions of the first and second subframes 1112a, 1112b. For example, some embodiments include a backside idler pulley 1120a coupled to pulley support 1218 of the first subframe 1112a. In some embodiments, the pulley support 1218 can be positioned generally perpendicular to the first subframe 1112a, extending from the support member 1214 towards the second subframe 1112b. Further, in some embodiments, the second subframe 1112b can include a pulley support 1219, to which a backside idler pulley 1120b can be mounted. In some embodiments, the pulley support 1219 can be positioned generally perpendicular to the second subframe 1112b, extending from the support member 1216 towards the first subframe 1112a. In some embodiments, the backside idler pulleys 1120a and 1120b can be attached to pulley supports 1218, 1219 with a spindle or other conventional mechanism to facilitate rotation of the backside idler pulleys 1120a, 1120b.

Some embodiments can include at least one belt idler pulley 1118 mounted to the main frame 1102. In some embodiments, the relative movement and position and/or tension of one or more of the backside idler pulleys 1120a and 1120b with respect to the belt idler pulley 1118 can be tensioned or adjusted using one or more tension springs. For example, in some embodiments, one end of a tensioner spring 1425 can be coupled to an eyebolt 1426 of the belt idler pulley 1118, with a second end of the tensioner spring 1425 coupled to the shaft 1121 of the backside idler pulley 1120b. In some embodiments, tension can be adjusted by moving the eyebolt 1426. For example, by increasing the distance between the eyebolt 1426 and the shaft 1121, the tension in the tensioner spring 1425 can be increased. Further, by decreasing the distance between the eyebolt 1426 and the shaft 1121, the tension in the tensioner spring 1425 can be decreased. Further, in some embodiments, a second end 1402 of a swing arm 1400 can be coupled to the shaft 1121 of the backside idler pulley 1120b and the second end of the tensioner spring 1425, while the first end 1404 of the swing arm 1400 can be coupled to the pulley support 1219.

In some embodiments, power can be transmitted from an engine 1108 to the drive pulley 1110 via an endless belt 1132. In some embodiments, the endless belt 1132 can be an "A" section belt, although in other embodiments, a "V" section belt, a flat belt, or other type of belt can be used. For example, in some embodiments, idler pulley(s) 1118 and backside idler pulleys 1120a, 1120b can receive an endless belt 1132 that can be driven by the engine 1108 through the drive pulley 1110. In some embodiments, the endless belt 1132 can also be received by one or more pulleys coupled to either or both of the hydrostatic transaxles 1114a,1114b. For example, in some embodiments, the endless belt 1132 can be received by driven pulley 1122a of the hydrostatic transaxle 1114a and/or driven pulley 1122b of the hydrostatic transaxle 1114b. Thus, in some embodiments of the invention, through this pulley-belt coupling, power from an internal combustion engine 1108 can be transferred to either or both hydrostatic transaxles 1114a, 1114b. When assembled within the ZTR mower 10, this configuration can enable drive wheels 104 to be independently suspended by the first and second subframes 1112a, 1112b, and independently driven by the hydrostatic transaxles 1114a, 1114b. In some other embodiments, alternative methods of driving hydrostatic transaxles 1114a, 1114b, such as through a universal drive shaft can be used.

In some embodiments, when the ZTR mower 10 is equipped with the suspension system 1103, and the mower 10 traverses a terrain, or is loaded and unloaded, the main frame 1102 can move with respect to either or both of the first and second subframes 1112a, 1112b. For example, when an operator mounts the ZTR mower 10, or if additional weight or equipment is loaded onto the ZTR mower 10, the frame 1102 can move with respect to either or both of the first and second subframes 1112a, 1112b. Furthermore, during loading of the ZTR mower 10, in some embodiments, the coil spring-type suspension components 1125, 1126, coupled to both main frame 1102 can compress, and the first and second subframes 1112a, 1112b can pivot about the pivot axis 1116a, 1116b on pivots 1115a, 1115b respectively.

In some embodiments, the backside idler pulley 1120a can pivot on the pivot 1115a around the pivot axis 1116a while coupled to a portion or region of the main frame 1102. Therefore, in some embodiments, the first subframe 1112a can allow the backside idler pulley 1120a to pivot with respect to the belt idler pulley 1118. Further, the backside idler pulley 1120b can pivot using pivot 1115b around the pivot axis 1116b while coupled to a portion or region of the main frame 1102. Therefore, in some embodiments, the second subframe 1112b can allow the backside idler pulley 1120b to pivot with respect to the belt idler pulley 1118. Further, the backside idler pulleys 1120a, 1120b can pivot with respect to each other and the belt idler pulley 1118.

Figure 23:
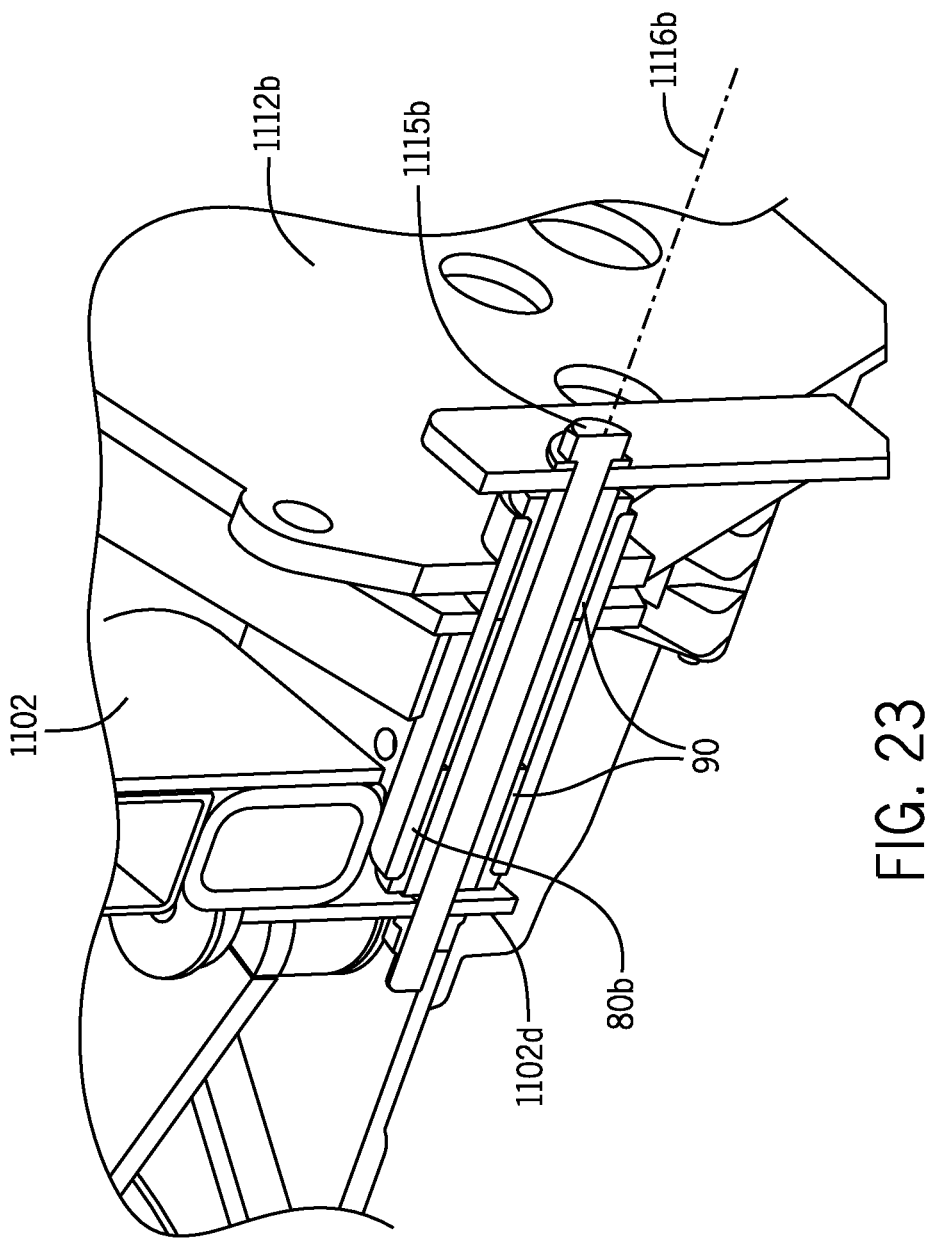
FIG. 23 illustrates a close up detailed sectional view of a suspension system of a ZTR mower in accordance with some embodiments of the invention.

Further details of the pivots 1115a, 1115b are illustrated in FIG. 23 which illustrates a close up detailed sectional view of a suspension system 1103 of a ZTR mower 10 in accordance with some embodiments of the invention. This view illustrates one side of the suspension 1103 illustrating detail of a pivot 1115b and pivot axis 1116b of the second subframe 1112b, however it is representative of the pivot 1115a and pivot axis 1116a of the second subframe 1112a. In some embodiments, the pivot 1115b can be supported by portions of the main frame 1102 as shown, and can enable the second subframe 1112b to rotate or pivot with respect to the main frame 1102. For example, the pivot 1115b can be supported by an outer section 1102c of the main frame 1102 passing through one or more bearings 90 positioned between sections of the second subframe 1112b, and supported at the other end by an inner portion 1102d of the main frame. For example, in some embodiments, the pivot 1115b can pass through pivot sleeve 80b housing the bearings 90. Thus, in some embodiments, the second subframe 1112b to rotate or pivot with respect to the main frame 1102 by rotating or pivoting on the bearings 90.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A suspension system for ride-on equipment, the suspension system comprising:
   a main frame including at least two independent subframes separately suspended from and coupled to opposite sides of the main frame, the at least two independent subframes comprising a first subframe including a first pivot proximate a first end of the first subframe, and a second subframe including a second pivot proximate a first end of the second subframe,
   the first pivot configured and arranged to enable pivotal rotation of the first subframe on the main frame around a pivot axis, and the second pivot configured and arranged to enable pivotal rotation of the second subframe on the main frame around the pivot axis; and
   a first transaxle assembly supported by the first subframe and coupled by a belt to at least one external power source, the at least one external power source coupled to and supported by the main frame and positioned external to the first and second subframes; and
   a second transaxle assembly supported by the second subframe and coupled by the belt to the at least one external power source, the second transaxle assembly configured and arranged to be pivoted by the second subframe with respect to the main frame independent of the first transaxle assembly and the first subframe, and the first transaxle assembly configured and arranged to be pivoted by the first subframe with respect to the main frame independent of the second transaxle assembly and the second subframe.

2. The suspension system of claim 1, further comprising a first compressible suspension component coupling a second end of the first subframe to a first side of the main frame; and
   a second compressible suspension component coupling a second end of the second subframe to a second side of the main frame.

3. The suspension system of claim 2, wherein at least one of the first compressible suspension component and the second compressible suspension component comprises a shock absorber.

4. The suspension system of claim 3, wherein the shock absorber is a coil spring shock absorber.

5. The suspension system of claim 1, wherein the first transaxle assembly includes at least one driven pulley positioned suspended with the first subframe.

6. The suspension system of claim 1, wherein the second transaxle assembly includes at least one driven pulley positioned suspended by the second subframe.

7. The suspension system of claim 1, wherein at least one of the first transaxle assembly and second transaxle assembly are configured and arranged to be belt-driven by the at least one external power source during pivotal motion about the main frame.

8. The suspension system of claim 1, wherein at least one of the first transaxle assembly and second transaxle assembly comprises a hydrostatic transaxle.

9. The suspension system of claim 1, wherein the first subframe comprises a first support member and a first pulley support positioned generally perpendicular to the first support member, and extending towards the second subframe, and wherein the second subframe comprises a second support member and a second pulley support positioned generally perpendicular to the second support member.

10. The suspension system of claim 9, further comprising a pulley and belt drive assembly, the pulley and belt drive assembly including:
   at least one backside idler pulley positioned supported on at least one of the first pulley support and the second pulley support;
   at least one belt idler pulley positioned outside of the first and second subframes and supported by the main frame;
   wherein the belt is an endless belt coupled with at least one driven pulley, the at least one belt idler pulley and the at least one backside idler pulley, the at least one driven pulley positioned suspended by at least one of the first subframe and the second subframe.

11. The suspension system of claim 10, wherein the at least one endless belt is further coupled with at least one drive pulley of the at least one external power source; and
   wherein the at least one backside idler pulley is configured and arranged to pivot with respect to the at least one drive pulley.

12. The suspension system of claim 11, further comprising an auxiliary drive pulley coupled to a power take-off shaft of the at least one external power source.

13. The suspension system of claim 12, further comprising a cutter assembly coupled to the auxiliary drive pulley by the at least one endless belt.

14. The suspension system of claim 10, wherein the at least one drive pulley is configured and arranged to rotate the at least one backside idler pulley.

15. The suspension system of claim 10, wherein the at least one drive pulley is coupled to rotate the at least one driven pulley.

16. The suspension system of claim 10, further comprising a tensioner spring coupled between an eyebolt of the at least one belt idler pulley and the at least one backside idler pulley.

17. The suspension system of claim 16, wherein the tensioner spring is coupled to a swing arm.

18. The suspension system of claim 1, wherein the external power source is an engine is coupled to and supported by the main frame; and
  wherein the at least two independent subframes are configured and arranged to pivot with respect to the engine.

19. The suspension system of claim 1, wherein a mower deck is coupled to and supported by the main frame.

20. The suspension system of claim 1, wherein the first and second pivots are positioned passing through one or more bearings positioned within a pivot sleeve, the one or more bearings supporting a pivoting motion of the first and second subframes.

\* \* \* \* \*